United States Patent [19]

Sidley

[11] Patent Number: 4,760,527

[45] Date of Patent: Jul. 26, 1988

[54] SYSTEM FOR INTERACTIVELY PLAYING POKER WITH A PLURALITY OF PLAYERS

[76] Inventor: Joseph D. H. Sidley, 7210 Park Terr. Dr., Alexandria, Va. 22307

[21] Appl. No.: 873,098

[22] Filed: Jun. 5, 1986

Related U.S. Application Data

[63] Continuation of Ser. No. 482,315, Apr. 5, 1983, abandoned.

[51] Int. Cl.[4] .................. G06F 15/44; A63F 1/48; A63F 9/22
[52] U.S. Cl. .................. 364/412; 273/85 CP; 273/DIG. 28
[58] Field of Search ... 364/200 MS File, 900 MS File, 364/412; D21/37; 273/85 CP, 85 G, 237, 274, DIG. 28

[56] References Cited

U.S. PATENT DOCUMENTS

| | | | |
|---|---|---|---|
| D. 251,395 | 3/1979 | Kula | D21/37 |
| 1,919,922 | 7/1933 | Baker, Jr. et al. | 353/34 |
| 3,671,041 | 6/1972 | Taylor et al. | 273/237 |
| 3,735,982 | 5/1973 | Gerfin | 273/85 CP |
| 3,770,269 | 11/1971 | Elder | 273/1 E |
| 3,796,433 | 3/1974 | Fraley et al. | 273/138 A |
| 3,810,627 | 5/1974 | Levy | 273/138 A |
| 3,819,186 | 6/1974 | Hinterstocker | 273/138 A |
| 3,876,208 | 4/1975 | Wachtler et al. | 273/138 A |
| 3,889,956 | 6/1975 | Castle | 273/85 CP |
| 3,909,002 | 9/1975 | Levy | 273/138 A |
| 3,998,462 | 12/1976 | Goott | 273/138 R |
| 4,033,588 | 7/1977 | Watts | 273/138 A |
| 4,052,057 | 10/1977 | Castle | 273/1 E |
| 4,093,215 | 6/1978 | Ballard | 273/138 A X |
| 4,193,600 | 3/1980 | Armstrong et al. | 340/323 R X |
| 4,314,336 | 2/1982 | Bernstein et al. | 340/323 R X |
| 4,335,809 | 6/1982 | Wain | 364/900 X |
| 4,339,134 | 7/1982 | Macheel | 364/900 X |
| 4,362,303 | 12/1982 | Pell | 273/274 |
| 4,372,558 | 2/1983 | Shimamoto et al. | 364/410 X |
| 4,373,719 | 2/1983 | Nelson et al. | 273/1 E |
| 4,380,334 | 4/1983 | Minkoff et al. | 340/323 R X |
| 4,421,313 | 12/1983 | Chang et al. | 273/237 |
| 4,441,714 | 4/1984 | Goott | 273/138 A X |
| 4,467,424 | 8/1984 | Hedges et al. | 364/412 |

FOREIGN PATENT DOCUMENTS 2067080 7/1981 United Kingdom .......... 273/85 CP

OTHER PUBLICATIONS

Findler, N. V. "Computer Poker", *Scientific American*, vol. 239, No. 1, Jul. 1978, 144–151.

Primary Examiner—Jerry Smith
Assistant Examiner—Clark A. Jablon
Attorney, Agent, or Firm—Bacon & Thomas

[57] ABSTRACT

An electronic system for playing a card game of poker is disclosed which permits interactive wagering among a plurality of players. The system incorporates a central processing unit and a plurality of individual player consoles, each having a display device and an input device. The display shows each player his own hand as well as any "up" cards of other players. Each console contains an input device to enable each player to respond to game conditions and to transmit wagering data to the central processing unit. The central processing unit enables all players to make substantially simultaneous responses to a set of wagers of any plurality of players.

17 Claims, 13 Drawing Sheets

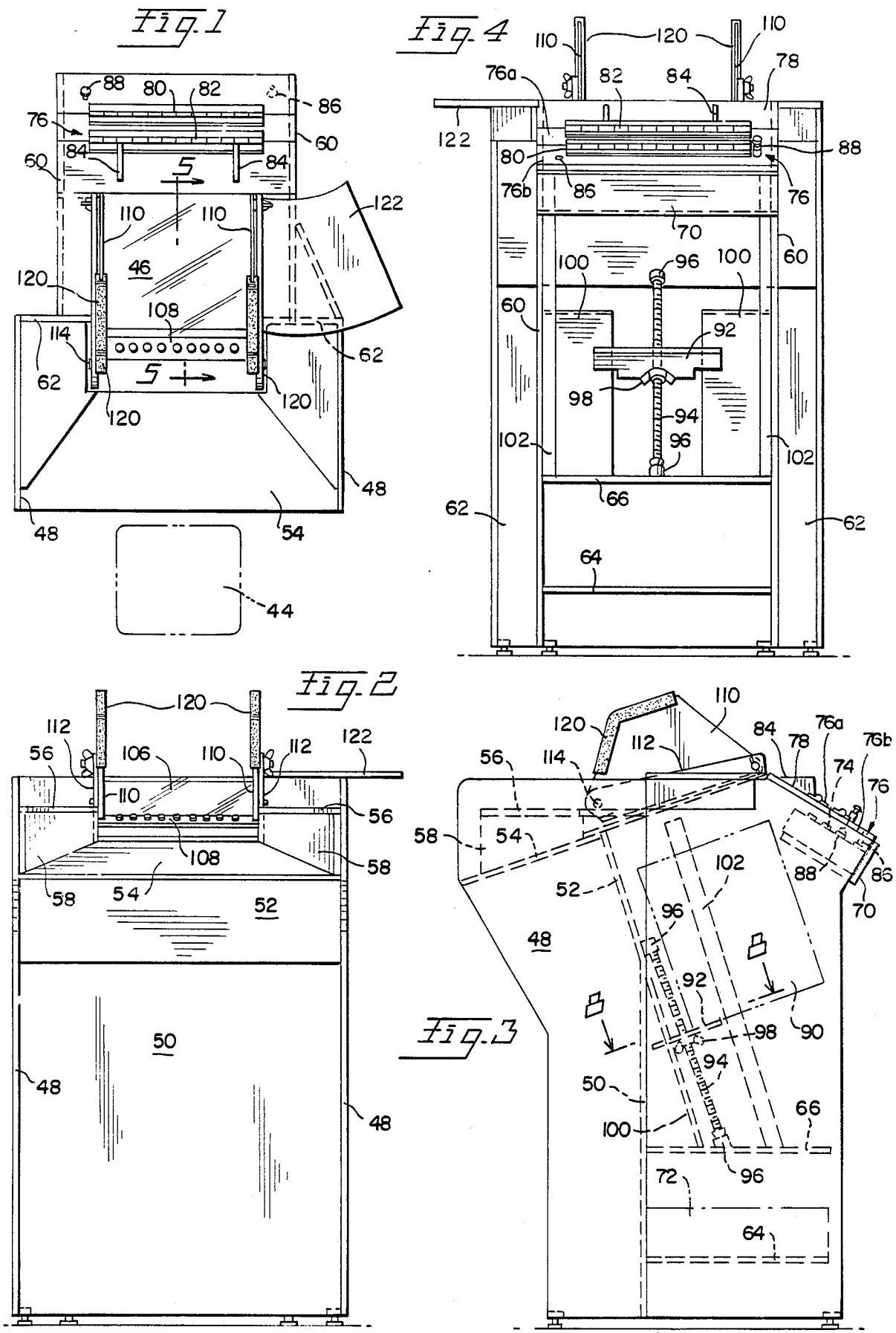

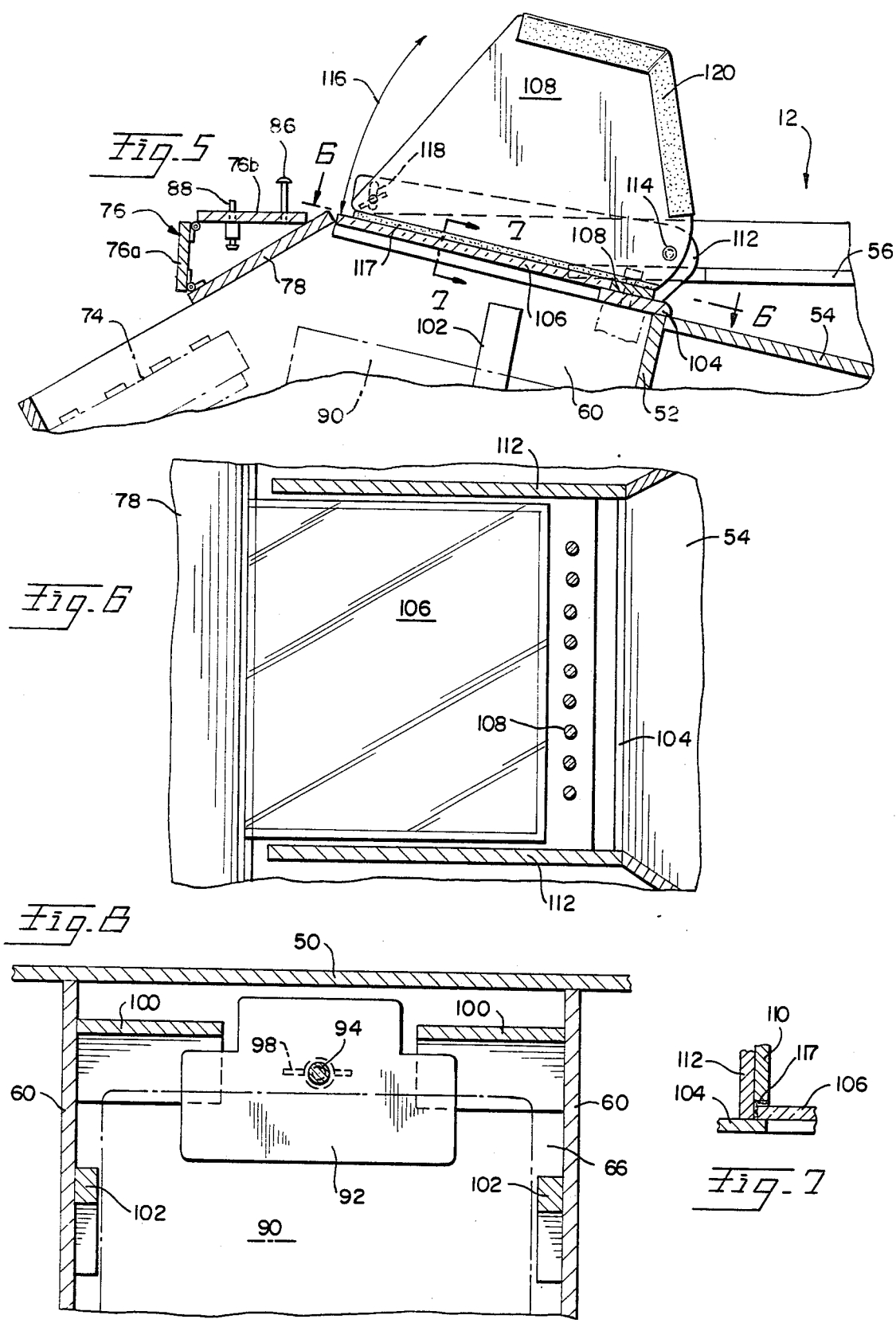

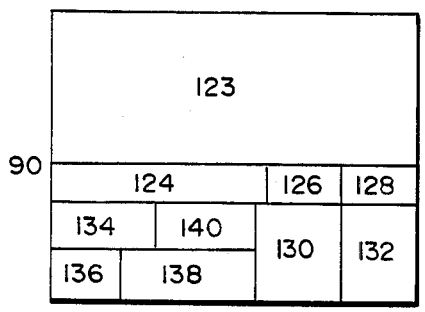
Fig. 10A
Fig. 10B
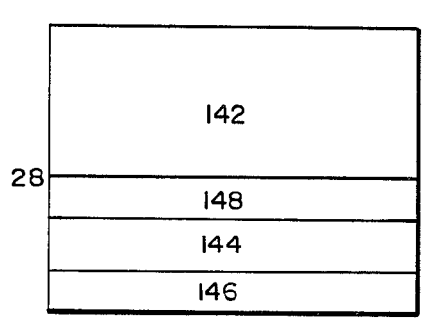
Fig. 10C
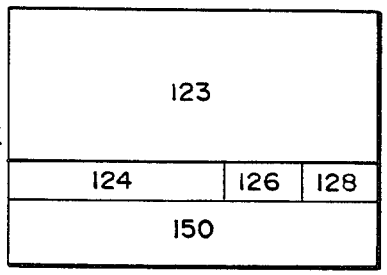
Fig. 10D
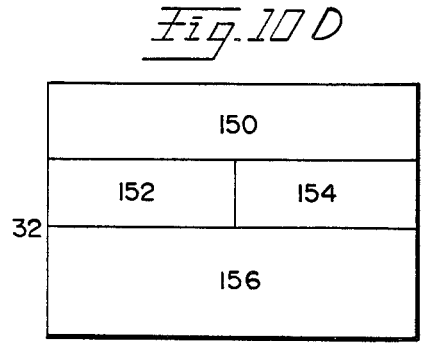
Fig. 10E
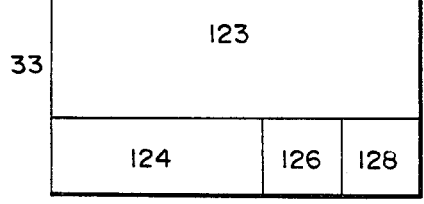
Fig. 10F
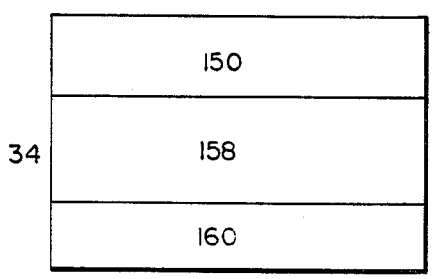

Fig. 15 PLAYER CONSOLE FLOW

CARDS DRAWN
6 9 2 2 0
5 5 7 2 2
F 6 8 4 3 5 1 3

Fig. 18

5-DRAW  HI-LO  ↑ RAISER  □ PANIC  » ALL-IN  $328 POT  DISCARD

YOU HAVE $75  HI - AA996
               LO - 99AA6

SEAT 3  A♠ 9♣ 9♦ 6♥ A♥

PRESS BUTTONS BELOW CARDS TO DISCARD / CANCEL DISCARD  WITHIN 20 COUNTS

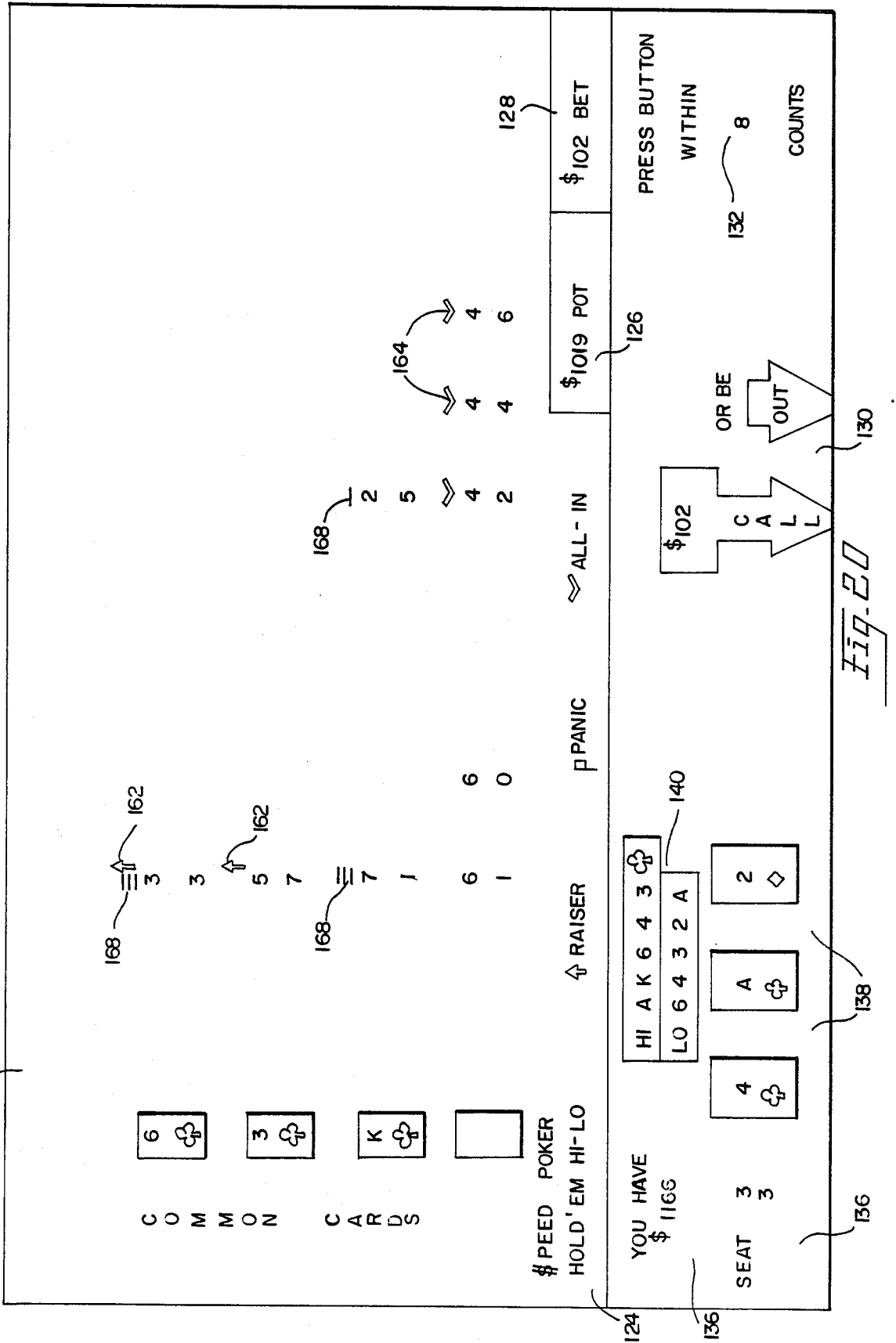

SYSTEM FOR INTERACTIVELY PLAYING POKER WITH A PLURALITY OF PLAYERS

This application is a continuation, of application Ser. No. 482,315, filed Apr. 5, 1983 and now abandoned.

BACKGROUND OF THE INVENTION

In recent years the number of gambling casinos, as well as the amount of money handled by them, has increased dramatically. In addition to new and larger casinos in well-established gambling resorts such as Monte Carlo, and those in the State of Nevada, the recent legalization of gambling in New Jersey, has resulted in a proliferation of casinos in Atlantic City. Games provided by these casinos must be able to attract the casual participant, as well as the "hard-core" player, and must provide constant interest for a large number of players in an attractive, exciting setting. For the most part, casinos have relied upon such games as roulette, craps, blackjack, keno, and various manifestations of slot machines to attract their audiences.

Poker, the most popular gambling game in America, has largely been ignored by casinos. The basic reasons for this are that casino poker games are slower and offer lower proportional winnings than other casino games and, hence, are less exciting for the players and less profitable for the casinos. The playing action in poker is slow because each player must, in turn, make a decision for each round of betting (and/or discarding), and the casino dealer must shuffle the cards, deal to each player, calculate the house cut from the pot, and make change for the players. High-low split pot games, a very popular form of poker require even more time since he must divide the pot among the high and low winners. The physical limitations of a 52-card deck places limits on the number of players who may participate in a given game, and also limits the amounts that can be won by the players and the percentage taken by the casino. Also, since poker is a game of skill as well as luck, the casual player often feels intimidated when playing against strangers, some of whom may be experts and others of whom may play very conservatively.

It is, of course, known to provide electronic devices to simulate the playing of poker or other card games. The known devices, however, are limited insofar as they allow only one or two players to play the game simultaneously and, although individual machines may have means to store data relating to the number of cards played and discarded, the betting totals, etc., none of the prior art devices discloses the concept of using a central computer unit to electronically simulate a gambling game and store large amounts of data from a relatively large number of game players. It is also known to provide electronic gaming devices wherein a plurality of individual units are electronically linked to a central computer which records and tabulates playing data. Most of these known devices rely upon the performance of an actual event (i.e., bingo, keno, horse racing, etc.) and do not provide an electronic simulation of the event itself.

Individual booths having electronically simulated gaming events are also known, but these are typically self-contained units for individual participants and no means are provided to link the units with a central computer which controls the game, and tabulates betting and card information.

SUMMARY OF THE INVENTION

The instant invention relates to a computerized gaming apparatus in which a game, namely poker, is electronically simulated on a plurality of individual consoles interconnected with a central computer unit which simulates and controls the game and, at the same time, tabulates and displays all betting information for each participant. The invention provides an apparatus which simulates the actual playing of poker for a large number of participants, increases the speed of the game to maintain participant interest and increases the amounts of money that may be won in the pot. The game allows up to 52 players to play in one pot and requires that all bets, raises, calls or discards in the selected poker game be accomplished in the same few seconds by all of the players, regardless of their number.

This is accomplished by interconnecting a plurality of consoles, one for each player, to a central computer unit which electronically simulates the playing of the game, controls the visual displays in each console and tabulates the necessary betting information. Each console displays all of the player's own cards and either the up cards of the other players or the number of cards drawn by other players (depending upon whether stud or draw poker is being played). When a request is displayed, each player has a few seconds in which to signal a call, raise, drop, or discard.

The computerized game according to this invention minimizes the time required to handle money transactions between the players and the casino, and also provides a printout system as well as a backup system to minimize the effects of possible mechanical or electrical failures. The game not only retains the elements of skill and luck found in regular poker, but adds the factor of decision-making speed to enhance the enjoyment for the participant.

The central computer can, of course, be programmed to play all types of poker games: draw, stud (5, 6 and 7 card), twist games, hold-em games (some common cards for all players), etc. However, 7-card stud, high-low split-the-pot has been found to be the poker bame that most individuals would prefer to play and the instant invention will be described primarily in relation to this configuration.

To maintain the interest of the players who have dropped out of the 7-card stud game prior to the appearance of their third up-card, the computer will automatically enter that player in a game of 5-card draw. This game is timed to end just slightly before the main 7-card stud game and the player will not only see the results of his game (draw), but also the results of the main stud hand. The alternative game of 5-card draw, as well as the high-low, split-the-pot factors, cause a great redistribution of the pot and a consequent reduction in the turn-over of the players. Since the number of players involved is relatively large, the size of the pot would be rather large relative to the amount that an individual player could call or raise in fixed limit games and, therefore, such games would be mainly ones in which many players would have a tendency to continue to call.

The game apparatus according to the invention also makes it possible to play poker games with hands that are outside the traditional realm. Hands consisting of more than five cards, such as 6-card straights, 7-card flushes and hands consisting of four of a kind plus three of a kind have previously been considered by poker experts, but to this point have been deemed to be impractical. In addition, new poker games, such as draw poker with two rounds of drawings or split-pot games with more than a twoway split are also made possible.

The apparatus enables the poker game to be played much faster than current poker games because the cards are dealt at a faster rate, and the number of players and their individual speeds no longer control the pace of the game. The players can also make their decisions faster, because there are no cards to remember (all are still available for all players) and the video screen display provides a snapshot view of the overall poker situation. The player who likes action will get more action than ever before possible, while at the same time, the player who likes to wait for a good hand will not have to wait as long with this invention.

Statistics can be continually gathered and correlated by the central computer unit to determine possible changes in the types of poker played, and at the time and betting limits to provide the largest pots in the optional amount of time. The apparatus can also be programmed for parimutuel betting on sports events by all the players. In this mode, players could make a bet on the result of the next play of a sporting event displayed on their screen from a computer-supplied list of alternatives.

BRIEF DESCRIPTION OF THE DRAWINGS

FIG. 1 is a top plan view of the individual player console according to the invention.

FIG. 2 is a front view of the console shown in FIG. 1.

FIG. 3 is a side view of the console shown in FIG. 1.

FIG. 4 is a rear view of the individual player console shown in FIG. 1.

FIG. 5 is a partial sectional view of the player console taken along lines 5—5 in FIG. 1.

FIG. 6 is a partial top view, partially in section, of the individual player console taken along lines 6—6 in FIG. 5.

FIG. 7 is a partial sectional view of the individual player console taken along line 7—7 in FIG. 5.

FIG. 8 is a partial sectional view showing the monitor support taken along line 8—8 in FIG. 3.

FIGS. 10A–10F are layouts of the various screen displays appearing on the various consoles according to the invention.

FIG. 17 is a view of the video display displayed on each player console for a 7-card stud poker game according to the invention.

FIG. 18 is a partial view of the video display shown on each player console for a 5-card draw poker game according to the invention at the time of the draw.

FIG. 19 is a partial view of the video display shown on each player console for a 5-card poker game according to the invention after the last raise round.

FIG. 20 is a view of an alternative embodiment of the video display shown on each player console for a common-card poker game according to the invention.

DETAILED DESCRIPTION OF THE PREFERRED EMBODIMENTS

General Configuration

Figure 9:
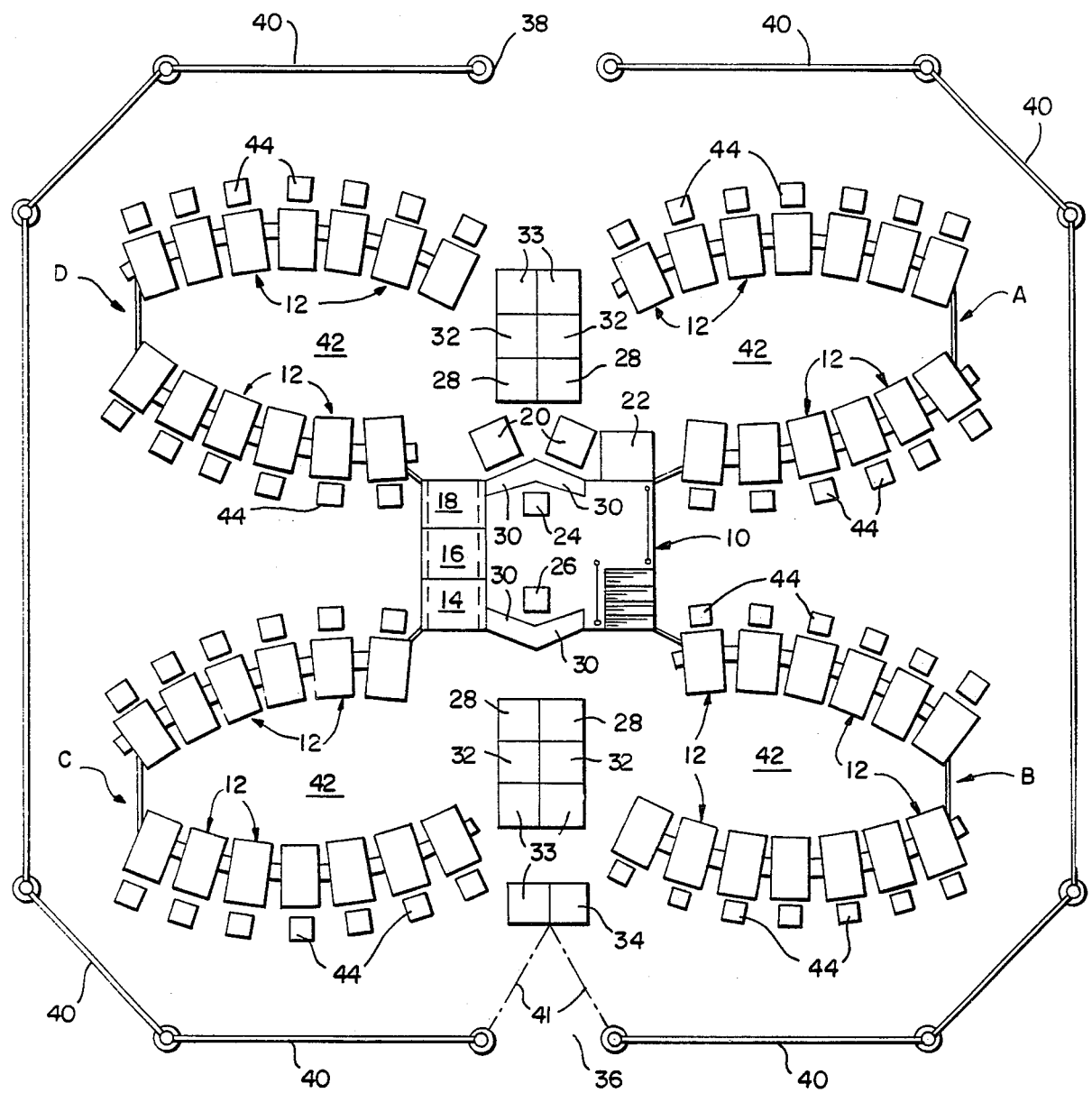
FIG. 9 is a top plan view showing an arrangement of a plurality of individual consoles and supervisor platform according to the invention.

The overall configuration of the gaming apparatus is shown in FIG. 9 and comprises a centrally located, elevated supervisor platform 10 with four player sections, A, B, C, and D. Each of the player sections contains thirteen individual player consoles to enable 52 players to participate in the game at one time. Each of the individual player consoles, designated generally at 12, will be described in more detail hereinafter. Although the invention will be described in relation to this particular configuration, quite obviously other configurations may be utilized, depending upon the physical limitations of the available area within each casino, without exceeding the scope of this invention.

The superior control platform 10 may be elevated to give the game supervisors a visual overlook of each of the player sections. The central computer unit (CPU) includes a minicomputer 14, a teletype 16, status and program disks 18, audit tape drives 20, and an audit printer 22. Audit tapes 20 and printer 22 may rest on the gaming area floor, while minicomputer 14, teletype 16, and disks 18 are located on platform 10 and may rest on a shelf over a passageway connecting various areas which are restricted to game and casino personnel. Also located on control platform 10 are two supervisory stations 24 and 26, each station having a pair of overhead RGB monitors 28, and a pair of microprocessor keyboards 30. The RGB monitors 28 and the microprocessor keyboards 30 are interconnected with the central processing unit's minicomputer 14 to display information and to enable the supervisors to input certain data, which will be hereinafter explained in more detail.

A pair of NTSC monitors 32 are located such that they may be viewed from each of the player's sections and are used to display various information of interest to service personnel and to the players. NTSC monitors 33 provide additional information regarding play in the current game which may be of interest to the players, prospective players, and service personnel. The NTSC monitors 32 and 33, along with the RGB monitors 28, may either be suspended from the ceiling or mounted upon pedestals to give them a height sufficient to be viewed by the players and/or by the service personnel servicing each of the player's sections. An additional NTSC monitor 34 is similarly mounted adjacent entrance-way 36. Monitor 34 provide game information and a listing of available seating to the incoming players. Entrance 36 and exit 38 are defined by barrier 40 which may be utilized to define the playing area. Barrier 40 may be a rope or other device which prevents passers-by from entering the game area while at the same time provides them a view of the players in order to generate an interest in the game. Players enter the game area at entrance-way 36 and proceed to the right or to the left to an open seat indicated on entrance monitor 34. A player departs the gaming area by proceeding to exit 38. Entrance 36 may be restricted to player use, and a pair of light beam announcers 41 may be used to aid in the orderly and swift entry of new players into the game.

Each of the player sections A-D contain two rows of player consoles, one row having seven consoles, the remaining row having six. The rows define a service area 42 between them. This service area enables cashiers or other service personnel ready access to each of the players. The layout of the game area also enables the supervisors to maintain a visual check during cash transactions between the cashiers and the players. Cashiers and other casino personnel would normally enter and exit the gaming area at exit 38 and their movements would normally be restricted to control platform 10, services areas 42, and a passageway adjacent to the platform which connects the service areas. Player movement in the game area as described above would be in a normally one-way direction along the outside of the player sections. Thus, there are two different physically defined areas: one for the players and one for all other service personnel in the game area. Any movement behind a player should be limited to an occasional player preceeding in a predetermined direction.

Although monitors 28, 32, and 33 are shown as being incorporated into a common module that may be either suspended from the ceiling or attached to the floor, they could be mounted separately without exceeding the scope of this invention.

Individual Player Console

The individual player console 12 is shown in detail in FIGS. 1-8. This console construction provides a comfortable, private, sturdy, non-confined area for the player to participate in the game, while at the same time providing complete privacy for each of the individual card displays. The console is also designed to provide a compact storage area for the video display and its associated electronic equipment while giving easy access to this equipment for service and/or replacement. The console design provides sufficient space for the player and for the placement of beverages, etc., in such a way as to not interfere with the player's access to the display screen and the actuating buttons. The individual console and its location with respect to adjacent consoles allows sufficient space for substantial changes in player position and posture, plus allows player entry and exit with minimum distraction to the surrounding players.

All references with respect to left and right sides will be made in accordance with the player's left and right side as he sits at the machine on stool 44 facing the viewing screen 46. The console comprises front side members 48 which are interconnected by lateral front panels 50 and 52, and armrest member 54. Horizontal shelf members 56, located on either side of the viewing screen, are attached to front side members 48 and supported by members 58 which extend from the lower surface of shelves 56 to the upper surface of armrest 54. Shelves 56 provide a flat, horizontal surface to support beverages, ashtrays, or other player convenience items.

Rear lateral side members 60 are connected to front members 48 by way of members 62 and serve to define the lateral limits of the equipment storage area of the console. Side elements 60 are interconnected by cross members 64, 66, 68, and 70. Member 64 is disposed in a horizontal orientation to provide a shelf for console microprocessor unit 72, as shown in FIG. 3. The details of this unit will be described in more detail hereinafter.

Cross members 68 and 70 provide a shelf and brace for microprocessor keyboard 74. Keyboard 74 permits the cashier or service personnel to enter any transactions between them and the player into the central processing unit 14. Keyboard 74 rests on cross member 68 and is normally covered by door 76 hingedly attached to cross member 78. Door 76 comprises two elements, 76a and 76b which are hingedly attached to each other via piano-type hinge 80. Door element 76a is similarly hinged to cross member 78 by hinge 82. Braces 84 are provided on cross member 78 and, as shown, provide support for door element 76b when door 76 is in its open position. Wwhen door 76 is open the inner surface of door element 76b is in a substantially horizontal orientation and provides a shelf for placement of chips, money, etc., during transactions between the cashier and the player.

A pin 86 attached to the underside of door element 76b engages a designated key on the keyboard 74 when door 76 is in its closed position and maintains this key in a depressed condition. Once the door 76 is open, the key is released and actuates a signal on the supervisor station to indicate to the supervisor that the console door is open. The supervisor then may make a visual check of the area to ensure that the door has been opened by the cashier or other authorized personnel. Push button 88 is also mounted on door element 76b such that it extends through the door and, when depressed, pushes a designated key on keyboard 74. Push button 88 may be springbiased in an upward position such that it is normally out of contact with the key. Certain transactions between service personnel and the player will not involve the transfer of cash or chips, such as beverage service, etc., and will not necessitate opening door 76 to enter data through keyboards 74. However, in order to cancel the notification of service once the service transaction has been completed, push button 88 may be depressed to thereby actuate the designated key without opening door 76. This will remove the request for service from the computer and/or the overhead monitor.

The console video display monitor 90 is located between rear lateral side elements 60 and rests upon adjustment support 92. Support 92 is adjustably supported on threaded element 94, which, in turn, is supported at either end by bearing members 96. Support 92 may be adjusted upwardly or downwardly by manual adjustment of wing nut 98 on threaded member 94. As shown in FIG. 8, support member 92 is generally T-shaped and has a central portion which extends between lateral guides 100. Further lateral support is given to monitor 90 by way of guides 102, each of which are attached to lateral side members 60. Guides 102 minimize the lateral shifting of the monitor 90 within sides 60 and serve to maintain its screen within the viewing area of the console. Vertical adjustment of the support 92 may be necessary to facilitate removal and/or servicing of the monitor 90 from the rear of the console.

The viewing area is defined by U-shaped member 104. The base of the U-shape extends across the bottom of the viewing area, while the sides of the U-shape defines the lateral edges of the viewing area. As seen in FIGS. 5 and 6, member 104 is attached between rear side members 60 and the armrest member 54. Glass screen 106 and push button strip 108 are both attached to the upper surface of member 104. Button strip 108, containing push buttons for activating the various choices and to be hereinafter explained in more detail, is permanently attached to member 104 such that it is readily accessible by the player. Glass screen 106, which is preferably of the non-glare variety, is retained in position on the upper surface of member 104 by pivoting view restrictors 110. View restrictors 110 extend upwardly from either side of the viewing area to prevent anyone other than the player from viewing his screen. Restrictors 110 are pivotally attached to supports 112 via pivot member 114 such that the rear edge may be pivoted in the direction of arrow 116. Supports 112 are attached to U-shaped member 104.

The bottom edge of view restrictor 110 has a rubber-like gasket material on its bottom edge which bears against the upper surface of glass 106. This material is generally designated as element 117. This prevents damage to the glass when engaged with the restrictors and serves to more rigidly retain the glass in its position. Supporters 112 may be provided with an arcuate slot 118 near its rear extremitiy and a screw and wing nut may extend through this slot and be attached to restrictor 110. Tightening the wing nut will serve to hold the rearmost portion of restrictors 110 into their lower portion against the glass 106 and button strip 108 to retain them in place. Should it be necessary to remove or replace the glass, or button strip, the wing nuts may be loosened or removed, and the restrictors pivoted forwardly. The exterior edges of each of the restrictors 110 may be padded, as indicated at 120, to prevent injury to the player should he accidentally come into contact with them.

Shelf 122 extends from one side of the console 12 and may be used to mount a telephone which will enable the player to communicate directly with the supervisor should there be a malfunction in his console unit. Shelf 122 together with the "T"-shape of the console in the horizontal plane serves to define the angle between adjacent consoles as shown in FIGS. 1 and 9.

Although the console has been described in terms of individual pieces and elements, quite obviously some may be formed integrally should the console be fabricated from fiber glass, plastic, or other moldable material. The respective elements of the console may be attached to each other by any known means, such as nails, screws, glue or the like. The electronics contained in each of the fifty-two individual player consoles may comprise the following items:

| | |
|---|---|
| 1 Microprocessor/Keyboard | IBM A210D |
| 1 Color Video Interface | IBM C156U |
| 1 RGB Monitor | Amdek Color-II |
| 1 Digital/Analog Input Interface | IBM C160U |
| 1 Set pressure-sensitive sealed membrane buttons | Sheldahl 1000-19 |
| 1 IEEE-488 Interface | Telmar PC-Mate |

Control Platform and Adjacent Area

As indicated previously, the control platform contains the CPU minicomputer 14, teletype 16, and status and program disks 18. In addition, each supervisory position contains microprocessor/keyboards 30 and RGB monitors 28. Each supervisory position also contains a telephone for communicating with any of the individual player consoles via the telephone at each console. The RGB monitors 28 allow each supervisor to keep advised of the progress of the game, status of each player, etc. Furthermore, the raised position of the control platform allows the supervisors to maintain visual supervision of the playing area.

The hardware components of the central computer processing unit may comprise the following elements:

| | |
|---|---|
| 1 Minicomputer | Data General Nova 4/S, with 16 slots |
| 1 Teletype | DG 6080A Dasher TP1 Subsystem printer, keyboard, interface, cable |
| 2 Magnetic Tape Transports | DG 6027 Tape Subsystem, 1 transport, controller, cables, DG 6023 Tape Transport |
| 2 Disks | DG 6030 Dual Diskette Subsystem, 2 diskettes, controller, cable |
| 1 Printer | DG 6086 Dasher LP2 Subsystem, printer, controller, cable |
| 2 IEEE-488 Controllers | Consulting Engineering, Gaithersburg, Maryland RBI-417 (4 boards each) |

Each of the supervisor stations on the control platform may comprise the following:

| | |
|---|---|
| 2 Microprocessors | IBM A210D |
| 2 Keyboards | Included in above |
| 2 Color Video Interfaces | IBM-C156U |
| 2 RGB Monitors | Amdek Color-II Monitor |
| 2 IEEE-488 Interfaces | TelMar PC-Mate |

Each supervisor station may contain two sets of electronic equipment so that two supervisors can operate at each station during times of heavy player turn-over, such as the opening and closing of the game. During other times, one supervisor may operate each station and the redundant set of electronics can be used for immediate back up in the event of hardware failure. If only one supervisor is operating a station, the second RGB monitor may be designated as a supervisor alternate monitor and may display game play. The contents of the monitor displays for monitors 28 are described in more detail hereinafter. The monitors 28 may be located generally to the front of the supervisor and he may view the playing sections by looking to his right or left.

Audit tapes 20 and printer 22 may be located on the floor of the gaming area in front of supervisor station 24. The floor area in front of supervisor station 26 may be reserved for other casino usage.

The particular construction of the control platform per se is not believed to be germane to the invention and, suffice to say, any structure supporting all of the necessary hardware and allowing the supervisors to have visual contact with the player area, is considered to be within the scope of this invention.

Overhead Displays

Overhead displays 32, 33 and 34 are located at various points in the playing area. Displays 32, used to provide information to the cashiers and food/beverage servers, are located adjacent the service area 42. Displays 33, showing play in the primary game (normally 7-card stud) may also be located within the service areas and adjacent the entrance to provide information of interest to the cashiers and to the prospective players. Display 34 located adjacent the game entrance provides prospective players, with information needed to enter the game, such as seat availability, minimum required buy-in stake, game rules and betting limits.

In FIG. 9, overhead displays 32 are shown at four locations, displays 33 at five locations, and display 34 at one location. The exact number and location of these overhead displays is not critical to the invention, but their number and location is limited only by their ability to be read by the persons to whom the information is directed.

Each of the overhead displays may comprise on NTSC monitor (such as Sony XK 1901), a microprocessor (such as IBM A210D), a color video interface (such as IBM C156U), and an IEEE-488 interface (such as TelMar PC-Mate). Display 34 may additionally comprise a pair of pulse-beam announcers 41 (such as Tandy 49-201) located at knee level adjacent the entrance 36 to signal the entry of a player into the game area, and a digital analog input interface (such as IBM C160U).

Display Contents

The elements which may comprise the contents of the displays on players monitor 90, supervisor RGB monitors 28, and NTSC monitors 32, 33 and 34 are shown in FIGS. 10A through 10F.

The upper portions 123 of each screen on player monitor 90 displays information common to all players in the hand. This display will show the rules and limits of a hand prior to the beginning of hand and then display the up cards for all players in stud hands, or the number of cards drawn by each player in draw hands plus symbols indicating which players have raised, gone all in for the pot or "panicked". The displayed area 124 shows the name of poker game being played plus an explanation of the symbols shown in portion 123. The pot display element 126 shows the amount of money currently in the pot. The decision element 128 shows any decision that the player must now act upon, such as discard of the amount bet.

Figure 17:
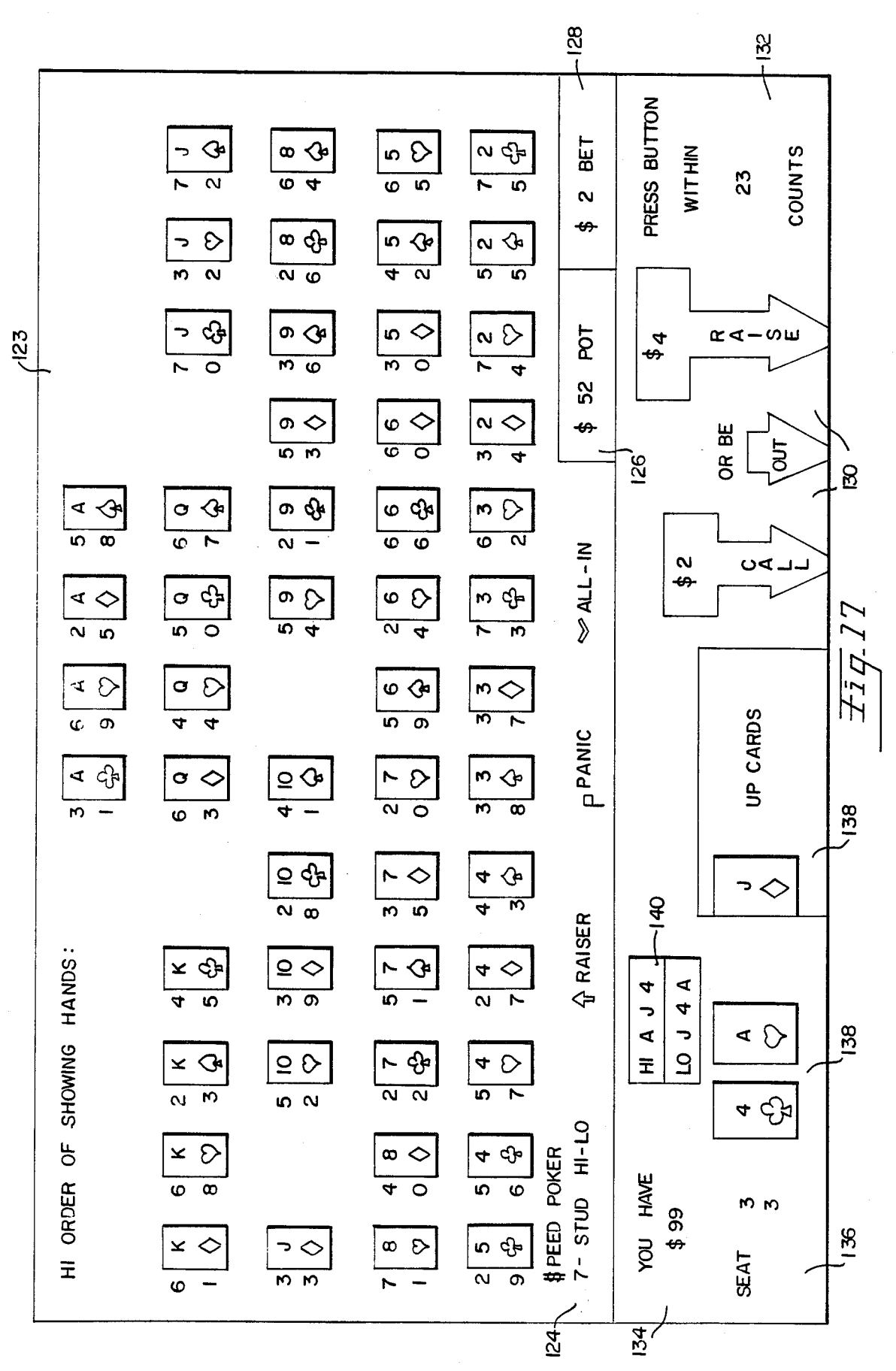

The lower portion of the display on player monitor 90 contains instruction area 130 which indicates how the player will signal his decisions and a timer area 132 which shows the remaining time within which the player must signal his decisions. This lower portion also contains information unique to each player: his seat number area 134; his remaining stake area 136; his entire hand in area 138; and the value of his high and low hands in area 140. A detailed description of displays appearing in elements 123 through 140 at the start of a 7-card stud hand is shown in FIG. 17.

The display of the player's own hand in area 138 and its values in area 140 is controlled by the appropriate push-button in button strip 108. When the hand is initially displayed, a first push of the button will cause the hand to disappear, while a second push of the button will make the hand reappear. This show/hide button provides additional security to the player and prevents anyone from inadvertently looking at his cards.

Supervisor RGB monitor 28 may contain: status information in area 142 about each seat in his section(s); directions in area 144 for the supervisor, such as the need to verify money in or out of the game; an image in area 146 of any keyboard input by the supervisor; and other information in area 148 as shown in FIG. 10B.

The information in status area 142 may include: seat number; stake left; total money put into the game by current player; a flag if the player's status is "panic"; the total number of "panics" for the player and for the console today; the date of last maintenance for the console; position in the cashier queue, if any, or identification of cashier present; and an indication of a seat being vacant; a practice hand being played; or which game, if any, the player is in. Other supervisor information in areas 148 may vary for supervisors, with seat availability information being displayed to the supervisor at station 26, and cashier money and house cut amounts being displayed to the supervisor at station 24.

If two supervisors are manning the supervisor station, each of the two monitors 28 will contain the status in area 142 for a different player section. If one supervisor is manning the console, one monitor 28 will contain the status for the two sections under his control while the other monitor may display the game elements as on areas 123, 124, 126, and 128 on player monitor 90 for the primary game, plus a consolation game summary in area 150 as seen in FIG. 10c. Summary area 150 may include: the name of the poker game; the amounts in the pot and currently bet; and the number of players who are in the pot, have raised, "panicked", or gone all-in. If the consolation game is draw poker, summary area 150 may also include the number of players who have drawn the varying number of discards. Between consolation hands, 150 may contain promotional or other messages.

Overhead monitor 32 also shows the same display as in area 150 plus, for the section to which it is directed, a list of players desiring food/beverage service in area 152, a list of open seats in area 154, and cashier directions in area 156 as shown in FIG. 10D.

Overhead monitors 33 may show the same display as in elements 123 through 128 on player monitor 90. Entrance monitor 34 may show the consolation summary as in area 150 (or promotional messages as previously mentioned), minimum buy-in stake and overall rules and limits in 158, and seat availability information in 160. Display element 160 may show the open seat number for the next waiting player and an arrow pointing in the direction of the seat with respect to the location of monitor 34 so that waiting players may swiftly and simply be directed to an open seat. If no seats are available, area 160 may display the number of players who are all in for the pot or who have almost exhausted their stakes so prospective players will have an indication of how long a wait there may be for open seats.

The displays appearing on any of the game monitors can be generated by graphics or by characters. In graphic displays, each dot on the screen, called a pixel, can be given color to form any desired shape. In character displays, a fixed series of pixels (for instance, eight horizontal x eight vertical) are defined into a foreground color and a background color. Several characters can be combined to create one shape. Character displays are limited only in that at most two different colours can appear in the fixed set of 8×8 pixels.

Each character set for a given make of equipment contains all letters (usually in upper and lower case), numbers, plus many special symbols—some including those for suits of a card deck. In addition, many makes of equipment provide for the addition or substitution of additional user defined characters either by software or by replacement of read-only memory chips.

The screen displays for the instant invention will be described in terms of character location with the horizontal character locations designated as columns and the vertical character locations designated as lines.

In RGB monitors 90 and 28 for the player console and supervisor station, the horizontal resolution needed for the game displays can only be achieved on a monitor screen that has separate "guns" for the basic colors of red, blue and green, with all of the other colors being some combination of these basic colors. In present technology, such RGB monitors are limited to relatively small sizes. Since overhead monitors 32, 33 and 34 must be read from greater distances than the monitors in the player consoles and supervisor stations, current RGB monitors are unsuitable due to their limited size. Screens of larger sizes are only available in standard composite signal monitors (NTSC). However, such composite signal monitors can display only approximately 40 columns of characters across the screen, whereas the RGB monitors are capable of displaying 80 characters.

Table 1 shows a sample configuration of the display elements specified by column and line character positions for the various display elements. Obviously, the size of various display elements can be adjusted by making some elements larger while making others smaller and additional elements may be added by reducing the size of one or more elements.

TABLE 1

| Display Element | RGB Monitors | Locations of Display Elements | | | | | | | |
|---|---|---|---|---|---|---|---|---|---|
| | | Line | | Column | | NTSC Monitors | Line | | Column | |
| | | Start | End | Start | End | | Start | End | Start | End |
| 123 | 90, 28* | 1 | 15 | 1 | 80 | 33 | 1 | 21 | 1 | 40 |
| 124 | 90, 28* | 16 | 17 | 1 | 52 | 33 | 22 | 25 | 1 | 26 |
| 126 | 90, 28* | 16 | 17 | 53 | 66 | 33 | 22 | 25 | 27 | 33 |
| 128 | 90, 28* | 16 | 17 | 67 | 80 | 33 | 22 | 25 | 34 | 40 |
| 130 | 90 | 18 | 25 | 45 | 68 | | | | | |
| 132 | 90 | 18 | 25 | 69 | 80 | | | | | |
| 134 | 90 | 18 | 20 | 1 | 12 | | | | | |
| 136 | 90 | 21 | 25 | 1 | 8 | | | | | |
| 138 | 90 | 21 | 25 | 9 | 49 | | | | | |
| 140 | 90 | 18 | 20 | 13 | 49 | | | | | |
| 142 | 28 | 1 | 15 | 1 | 80 | | | | | |
| 144 | 28 | 20 | 23 | 1 | 80 | | | | | |
| 146 | 28 | 24 | 25 | 1 | 80 | | | | | |
| 148 | 28 | 16 | 19 | 1 | 80 | | | | | |
| 150 | | | | | | 32, 34 | 1 | 9 | 1 | 40 |
| 152 | | | | | | 32 | 10 | 16 | 1 | 20 |
| 154 | | | | | | 32 | 10 | 16 | 21 | 40 |
| 156 | | | | | | 32 | 17 | 25 | 1 | 40 |
| 158 | | | | | | 34 | 10 | 19 | 1 | 40 |
| 160 | | | | | | 34 | 20 | 25 | 1 | 40 |

*alternate supervisor display 28

Cards shown in display element 123 normally occupy an area two characters wide by two characters high. At least one line is left above each card and may be used to display information regarding that particular player (i.e., a raise, "panic" or all-in symbol).

On the RGB monitors, such as player monitor 90, if more than fifty players remain in the pot for the third up-card; more than forty for the fourth up-card; or more than thirty for the last down card, each card will occupy an area one character wide by two characters high.

On NTSC monitors 33 the area occupied by each card in display element 123 will be reduced to one character wide by two characters high if more than forty-two players remain in the pot for the second up card, more than thirty-five for the third up-card, more than twenty-eight for the fourth up card, or more than twenty-one for the last down card. Moreover, if more than forty-two players remain in the pot for the fourth up-card, or more than thirty-five for the last down card, the player hands may be continued in display element 150 since the system may be programmed not to start a consolation draw hand if there are more than forty-two players remaining in the 7-card stud hand for the third up card.

Program Logic

The system for controlling the game consists of one central computer and its peripheral devices (CPU) which communicates with various microprocessors located in the supervisor and player consoles. The supervisor consoles initiate game activities while the player consoles display information, and report cashier and player transactions. The overhead display consoles merely display information. The CPU controls the simulation of the game and the communications between all of the components by means of an IEEE-488 interface system. IEEE-488 terminology is used in the descriptions wherein one unit is designated by the CPU to be the "talker" and any number of other units are designated as the "listener". However, the IEEE-488 system has means for any "listener" to initiate a "service request" which will enable it to become a "talker".

Figure 11:
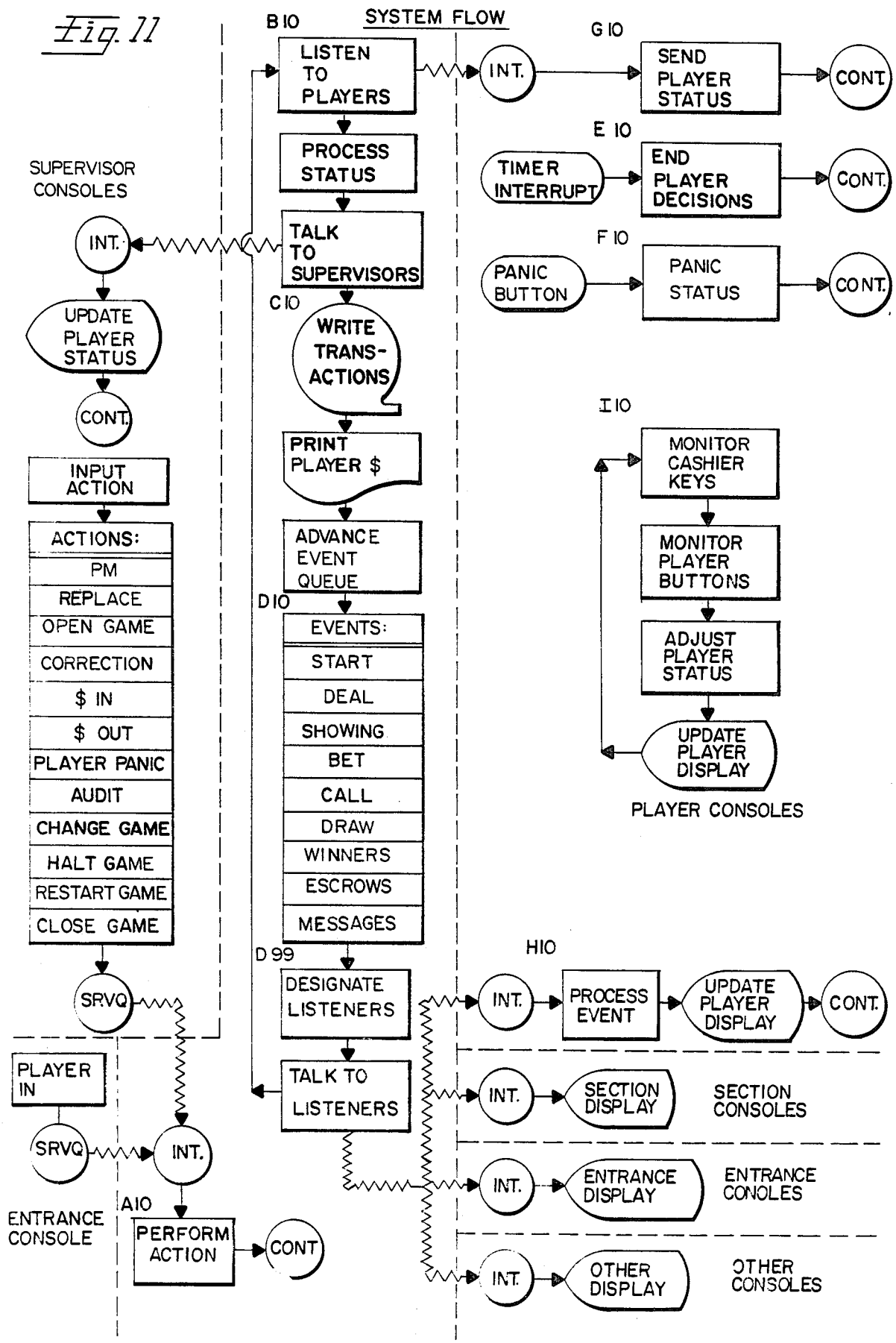
FIG. 11 is a flow-chart illustrating the logic sequence in the overall system according to the invention.
Figure 12:
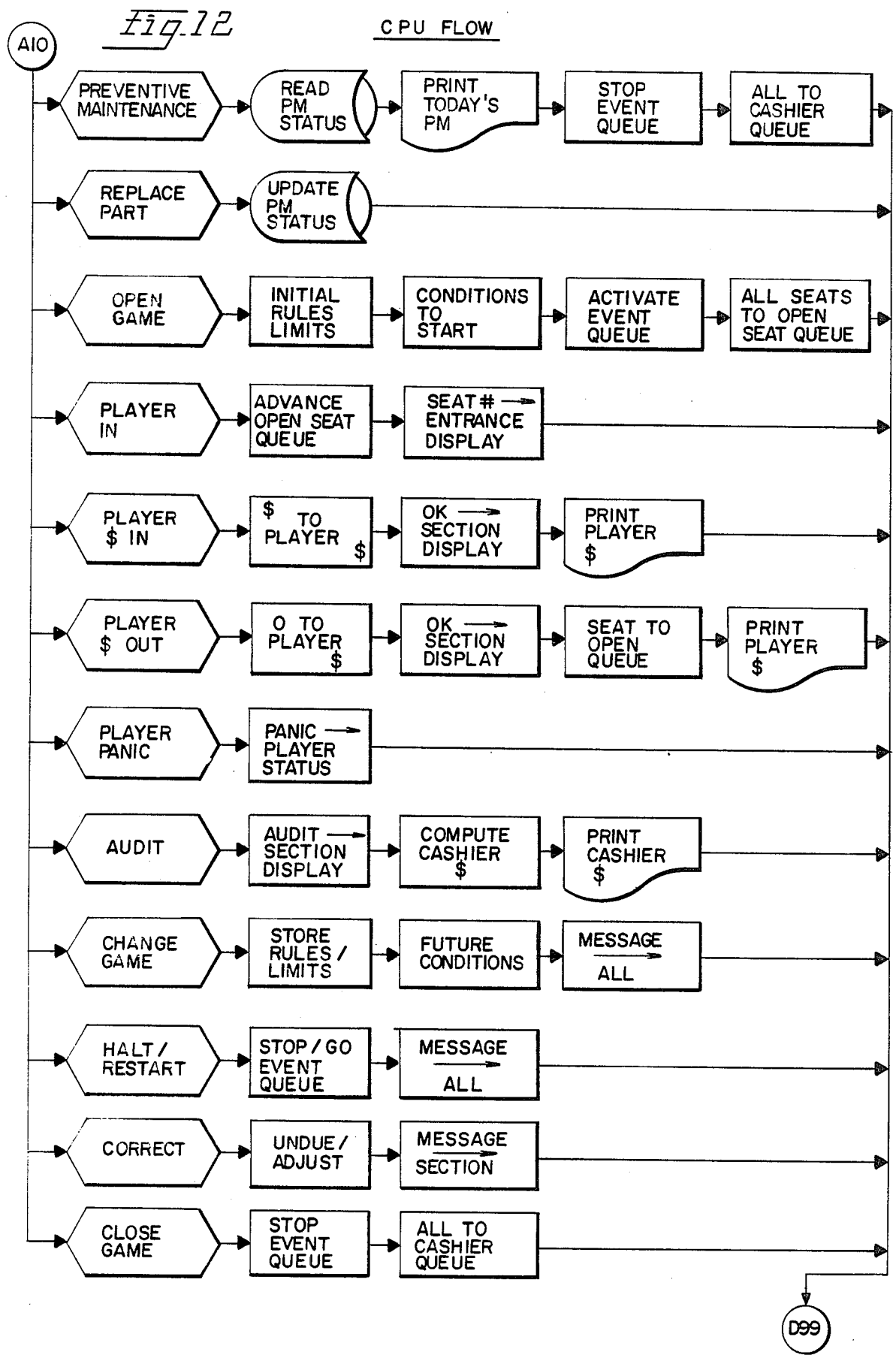
FIGS. 12 through 14 are flow-charts illustrating the logic sequence for the central processing unit program according to the invention.

The overall logic for the entire system is shown in FIG. 11, while the subsystem logic for the CPU, supervisor consoles, the player consoles, etc., are shown in FIGS. 12-16. Although the CPU controls the entire system, the supervisor console will be described first, since it supplies the instructions to the CPU for initiating the game. The logic flow diagram for the supervisory console is shown in FIGS. 11 and 12. Various CPU processing is initiated by input from the supervisory keyboard, which input is checked by the software and may result in a request for additional or corrected input. This input is listed in FIG. 11 and further described in FIG. 12 where the resulting CPU actions are also described. The final step in the processing path is a service request so that the desired action can be processed by the CPU. The supervisor control processing may be interrupted at any point to receive information from the CPU about the status of any player. This information updates the status display for a player on the supervisor's console and may require no positive action on the supervisor's part. However, if the player's status change is to put money into or take money from the game, the supervisor would first perform the displayed requirement (visually checking the amount, talking to the cashier by telephone, etc.) and then press a key on his keyboard to signal the CPU and hence the cashier information display that the player status is approved or made final.

Figure 13:
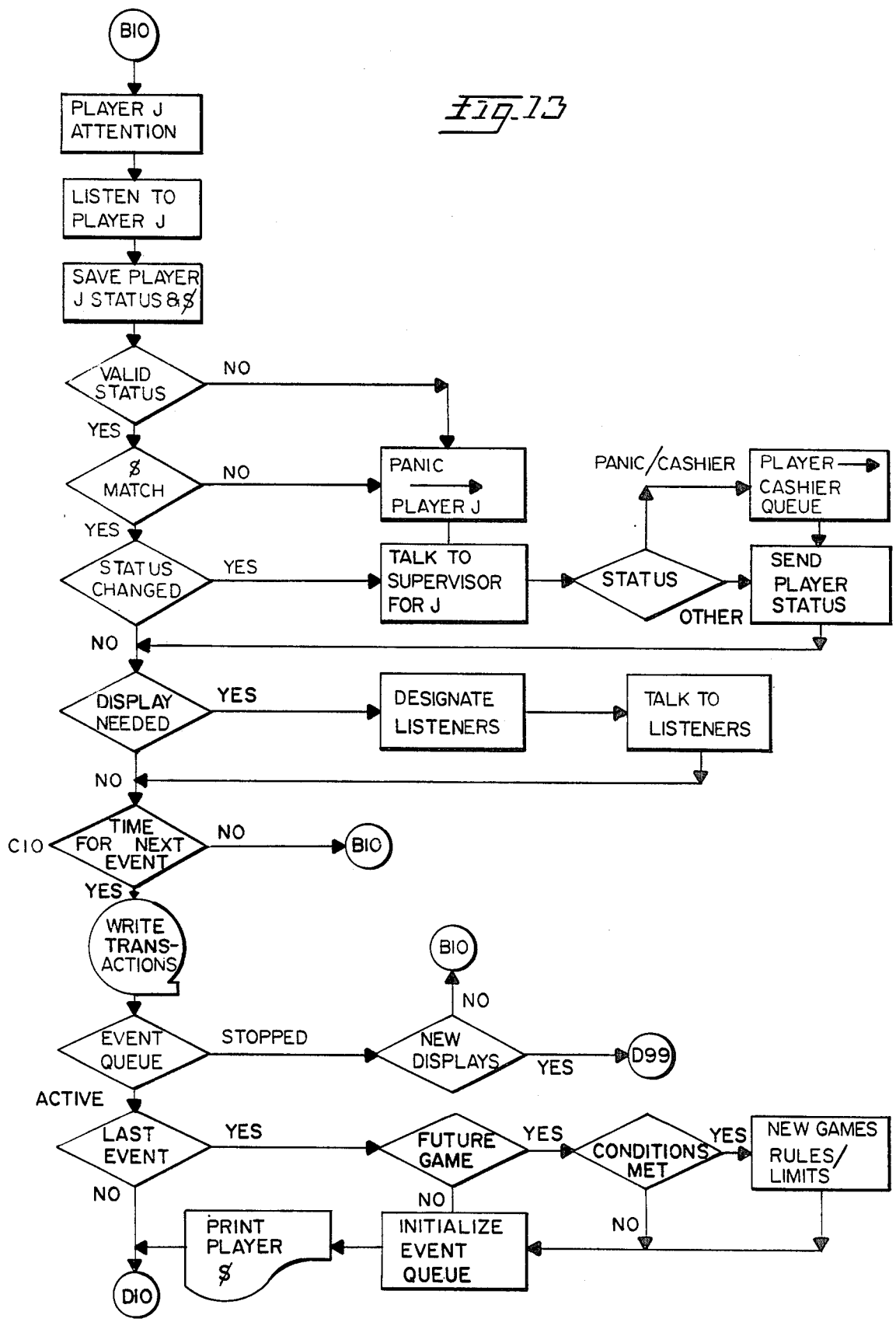
Figure 14:
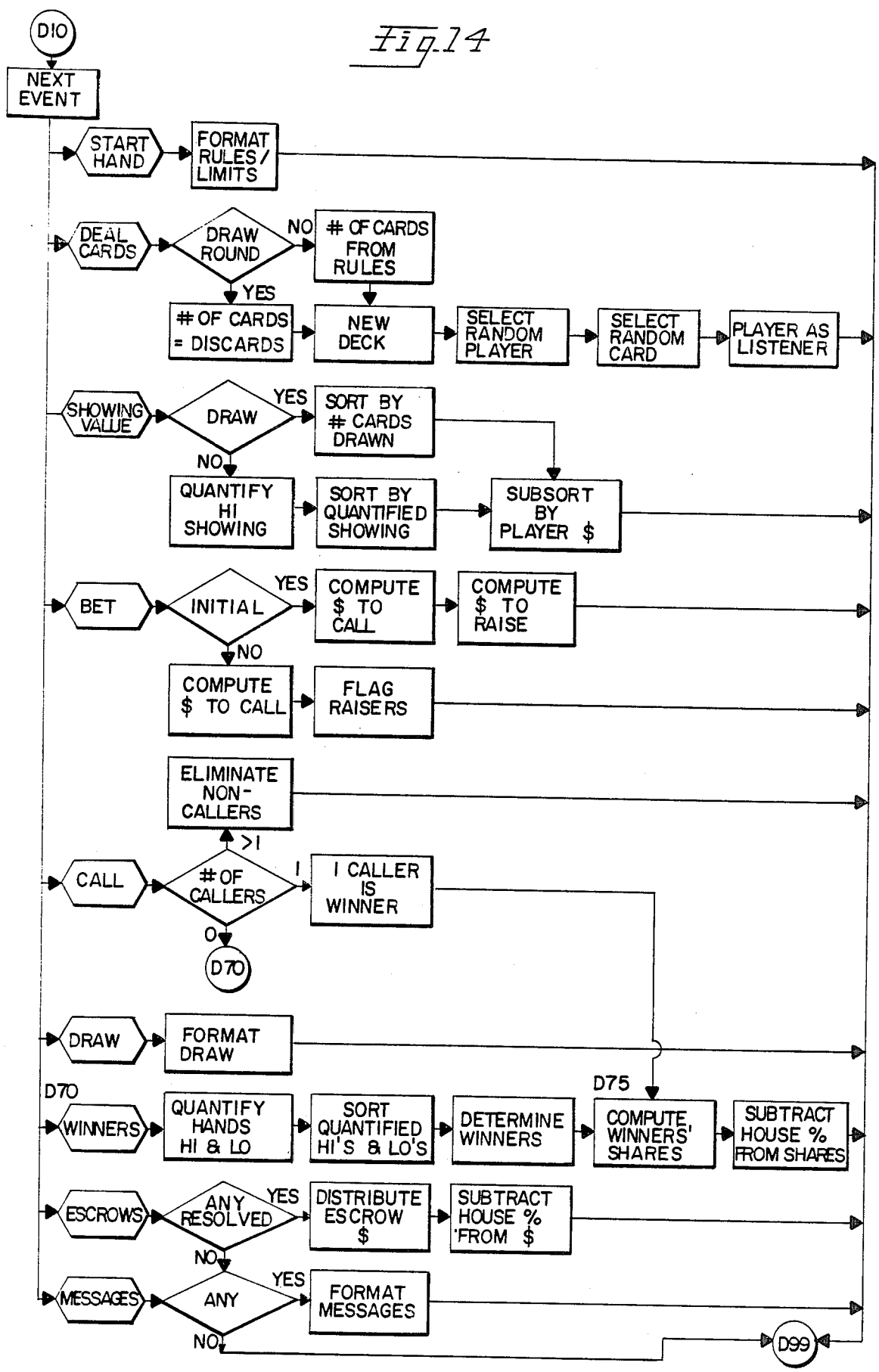

The CPU processing cycle, as shown in detail in FIGS. 12-14, consists of receiving information from each player console, processing this information, and sending any changes in player status to the supervisor console. The CPU will also control the generation of transaction records on magnetic audit tapes 20 and the printing of the current stake left for each player on printer 22. Game transactions may include all supervisor, cashier, and player inputs which are reported to the CPU plus cards dealt and winnings awarded by the CPU. These transactions are recorded for later normal audit processing and for recovery processing in the event of catastrophic system failure. They may also be utilized to compute statistics relating to amount of money in the pot, player reaction time, etc., for various hands. The CPU also maintains several software queues. Such a queue is a list of items in which items are taken from the front of the list when the queue is active. Items are normally added at the end of the list, but may be placed anywhere in the list. Control of the game play is achieved by means of an event queue, where the queue may contain sequential events for more than one game. As will be described in detail hereinafter, the computer provides an alternate game of 5-card draw poker for those players who have dropped out of the 7-card stud game prior to the appearance of their third up-card. A listing of the game events is shown in FIG. 11, while the events and their processing are described in more detail in FIG. 14. After each event, information is sent to the player's and supervisor's consoles and to the entrance displays. The CPU processing cycle may be interrupted to perform actions requested from the supervisors input console or as the result of a new player passing the entrance console light beam 41, which may also result in the sending of this information to other consoles.

Figure 15:
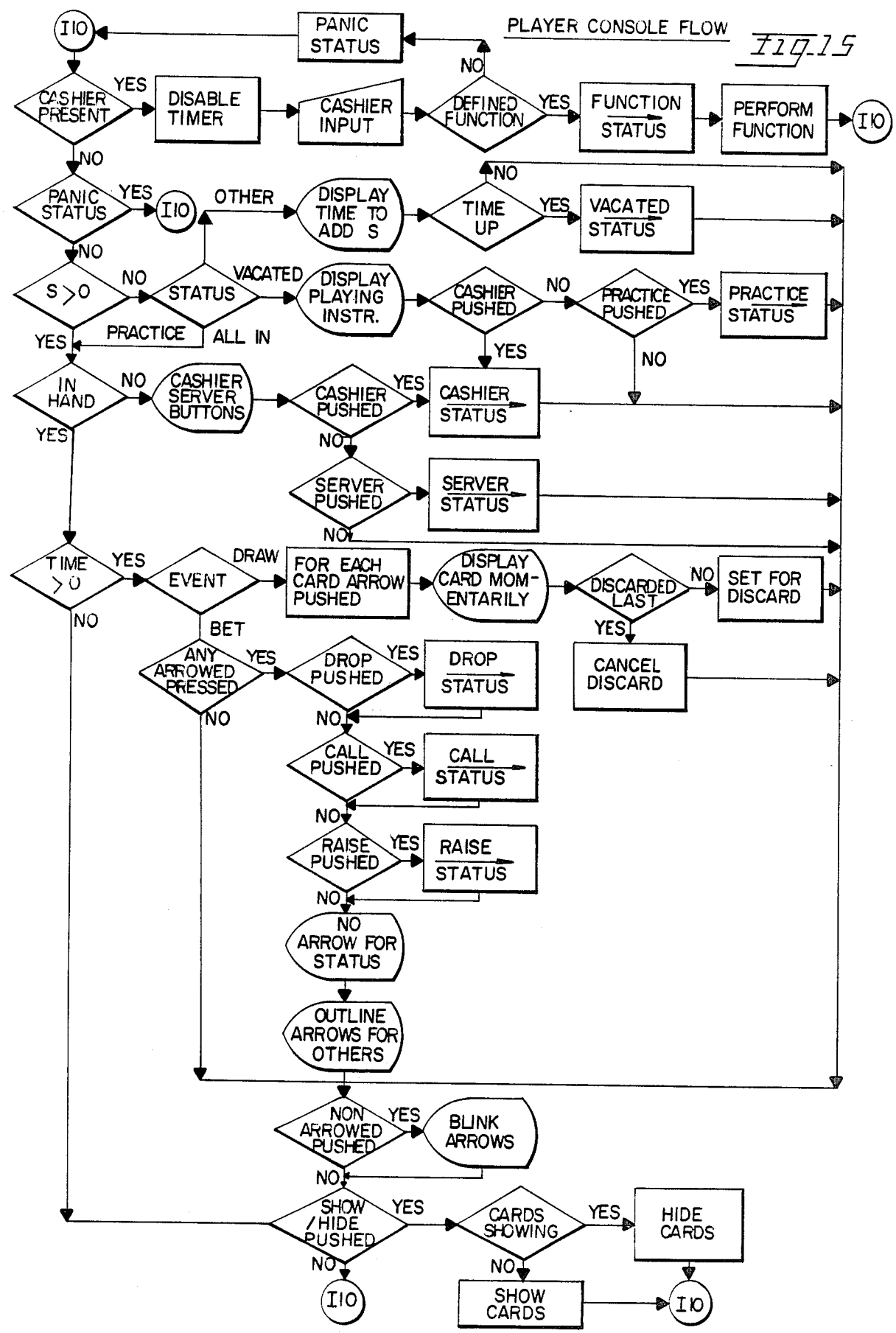
FIGS. 15 and 16 are flow-charts illustrating the logic sequence for each of the player consoles according to the invention.
Figure 16:
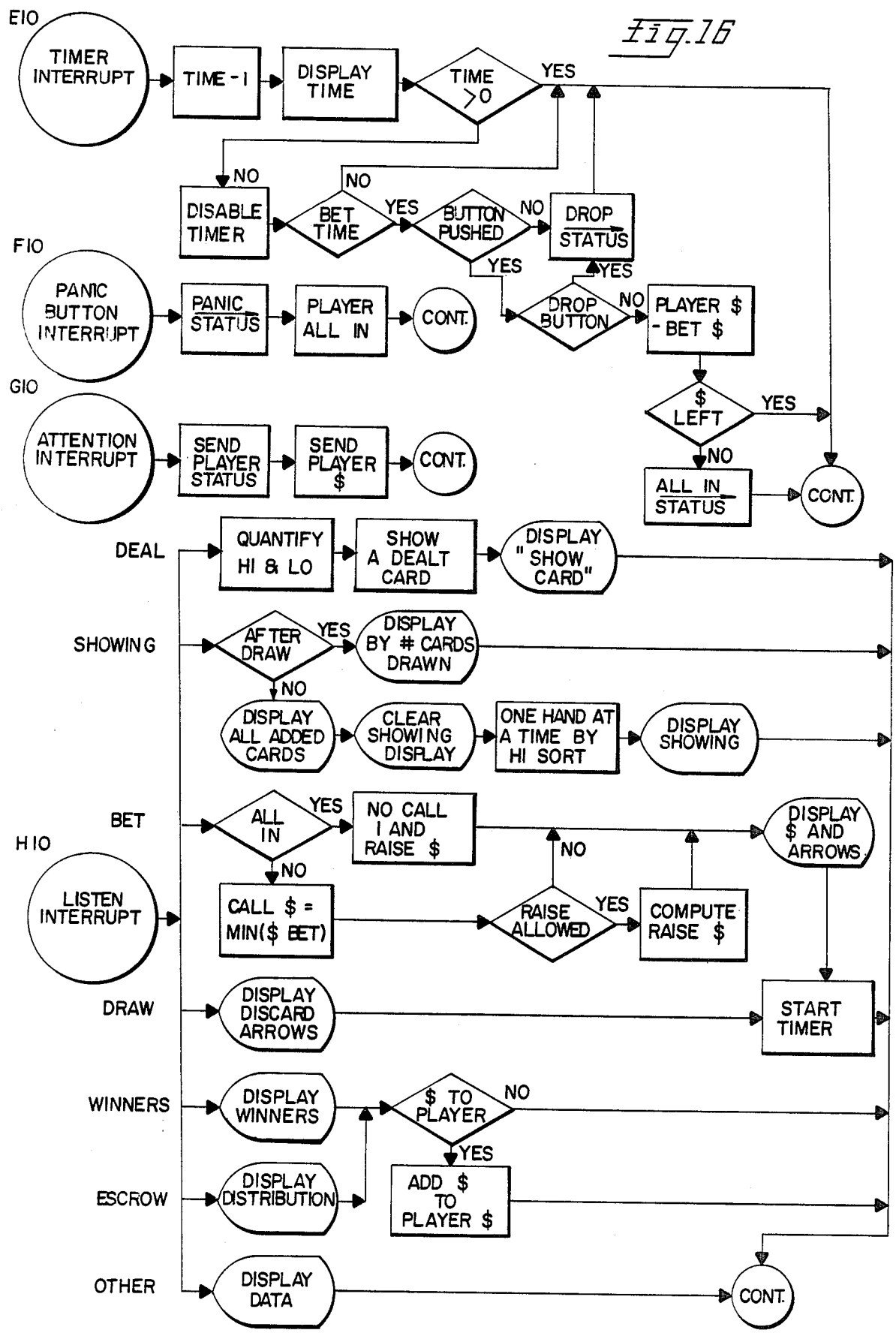

The player console processing cycle is shown in FIGS. 15 and 16 and consists of monitoring any input from the cashier's keyboard or the player's buttons, adjusting the player's status accordingly, and creating the player's console display screen. This cycle may be interrupted to send player status to the CPU, to show the remaining time for a player decision, or to receive event information from the CPU.

The system also contains overhead display and entrance display consoles. All of these consoles receive information from the CPU and display it, and only the entrance console may provide input from these devices to the CPU.

As shown in FIG. 11 and in more detail in FIG. 12, after initiating input data from the supervisory keyboard, the first step in starting the game is a review of a preventive maintenance (PM) file which contains the date on which the various computer hardware components were last replaced. This file is read by the CPU and matched against a stored estimated minimum useful life of each component. This comparison produces a listing of parts which are to be replaced that day, if any. If repairs are to be made, the event queue is not started and the appropriate player consoles are placed in the cashier queue in order to allow the necessary repairs to be made. Once any hardware component is replaced, the preventive maintenance file is updated and stored for retrieval on subsequent days.

After the preventive maintenance has been performed or if there is none to be performed that particular day, the CPU processing cycle is as follows:

Open game—the rules and limits of the start up games are specified as are the number of players required to begin play. The event queue is activated and all of the seats are placed into the open seat queue.

Player in—signalled by the entrance console as each player enters the game area. This will cause the open seat queue to be advanced and the next open seat to be displayed on the game entrance display to direct the incoming player to the available seat.

Player $ in—occurs after the cashier has received a player's money, the amount has been displayed to the supervisor who has verified the amount and approved the transaction. The money is added to the player's stake, this amount is printed out and an approval signal is displayed on the section display to indicate to the cashier that the transaction has been approved.

Player $ out—this occurs when the cashier has staged the amount of money due to be paid to the player and the supervisor has verified the amount and approved the transaction. The stake for the player's seat is zeroed and printed, an approval signal appears on the section display, and the seat is placed in the open seat queue.

Player panic—this event occurs when panic is reported by the individual console telephone to the supervisor's station and usually occurs as a result of a malfunction in the console, or incorrect action taken by the player during the game.

Audit—"audit" for the cashier will appear on the cashier's overhead section display and the total amount of cash and chips by denomination that the cashier should have is calculated and printed. The cashier's cash and chips will then be stored with the audit listing for later verification.

Change game—the rules and limits of a future game are specified in addition to the time in which the change will take place. A message regarding the new game is displayed after every 7-card stud hand.

Halt game—this is requested when, in the judgement of the supervisor, the game must be halted. The event queue stops immediately and a message regarding the stoppage of play will be displayed on each console.

Restart game—used only if the halt game event is in effect and will restart the game with an appropriate message of explanation.

Close game—last action of the day or gaming session. It stops the event queue when it reaches the next last event and places all of the players' seat numbers in the cashier queue.

The above actions would ordinarily be performed in the order listed, although action such as halt game and restart game, and player panic, will occur only under unusual circumstances. In addition, under exceptional circumstances it may be necessary for a supervisor to manually correct such things as an action he has initiated, consoles in the cashier or open seat queue, and player status. After the occurence of any of the above actions, the processing cycle goes to D99 in the CPU processing cycle.

The CPU processing cycle starts a polling of each player in which an attention signal is sent to each player's console, and status and stake data are received from the console and stored. If the status is invalid (or no data is received) or if the data regarding the player's stake does not match the stake as calculated by the CPU, the player's console is placed in "panic" status. If the player staus has changed since the last polling, the new status is sent to the supervisor console. If the new status is "panic" or "cashier" the player's console is automatically placed in the cashier queue for attention from the cashier. If any interrupt processing has established a display that should now be displayed, the appropriate consoles are designated as listeners and the contents of the displays transmitted to them.

When all polling related to the current event has been completed and it is not yet time for the next event, the CPU will continue polling the players until it is time for the next event. This secondary polling will allow the system to continue detecting input from the player consoles such as cashier transaction, panic, or requests for a cashier or food/beverage service.

A sample event queue for the simultaneous simulation of a 7-card stud game and a consolation draw game is described in detail in the discussion of approximate display time for each player decision.

At the next event time, a magnetic tape written record is made which contains all transactions during this cycle. If the event queue is active and the last event in the queue has been performed, a check will be made to determine of there are any future events and, if this is the case, any conditions for the future event will be tested. If the future event conditions are satisfied, its rules and limits replace those of the current game on the console display screen. In any case, after the last event, the event queue is sent back to the first event and the current stake for each player is printed on the audit printer 22. The defined events, as shown in FIGS. 11 and 14, are as follows:

Start hand—causes rules and betting limits to be displayed on the various monitors.

Deal cards—for each round of cards a new 52-card register is used. A player is randomly selected and then receives a random card not already in the player's hand as will be hereafter described in more detail. The number of cards dealt at one time depends upon the fixed rules of the game, except games in which the player may make discards. In this case, the number of cards dealt equals the number of cards discarded for that player.

Showing value—in draw poker, the hands are displayed in ascending sort order by number of cards drawn. For stud poker, the showing cards are first quantified, as will be described in more detail hereinafter, for their high value and are then displayed in descending order. For games in which there are neither a varying number of cards drawn nor showing cards, other sort orders may be utilized. A secondary sort factor for any of the above displays may be by descending amount of player stake left.

Bet—if the game is in the first bet per round, the call and raise amounts are computed from the predefined game limits. If there is an additional amount needed to call due to raises, this call amount may be the total of all the raises. All of the players who have raised are noted on the game displays.

Call—if there are no callers, the winners are determined immediately from all of the players who were in the pot. If there is only one caller, that player wins the entire pot. If there is more than one caller, all who did not call are eliminated from the pot and from the console displays.

Draw—causes draw arrows and instructions to be displayed on each of the players consoles.

Winners—the entire hand is quantified for both high and low values and sorted (high values are sorted in descending order; low values are sorted in ascending order) by quantification by the amount the player put into the pot. The winners and winners' shares are determined by a method explained in more detail hereinafter, while the house percentage is automatically subtracted from each winner's share.

Escrows—these are amounts in a pot which has not been fully resolved due to the presence of a "panic" player. When the validity of the "panic" has been determined, the amount of the pot in the escrow is awarded minus the house percentage.

Messages—any pertinent undisplayed messages will be displayed as the last event in the processing cycle.

After each of the above events, information is displayed on the player consoles. Some information may also be shown on the section and entrance overhead displays as previously described.

The processing cycle for each of the player consoles is shown in FIGS. 15 and 16 and consists of the following actions:

Cashier present—if the player console cashier's door is not closed, the cashier should be present. In this event, the timer interrupt is disabled and a request for cashier input is displayed on the player's console screen. The display faces the cashier's position behind the player's console and is upside down to the player's position. After a cashier input or a short wait, the input function is tested. If this function is missing or undefined, a "panic" code is placed in the player's status register. If the function is defined, the code for that function is placed in the player's status and its defined processing is performed. This may include further instructions to the cashier, additional input from the cashier, or an adjustment of the player's stake. The cashier's functions may include: putting the players money into the game; cashing-in the player; and performing diagnostics on microprocessor, its monitor, buttons, keyboard, and interfaces. Following the completion of this, the processing returns to the start cycle.

If a cashier is not present and if the player is not in "panic", the processing continues with the following tests:

$ greater than zero—if the player's stake is not greater than zero, the player's status is examined. If the status is practice or all-in, processing continues as if the stake were greater than zero. If the status is vacated, playing instructions are displayed on the console screen, with the player having the option to call for a cashier or to try practice hands. If the status is other than those specified above, the player will be notified that the cashier must be called within a displayed time or the seat will be declared vacant.

In hand—if the player's stake is greater than zero, but the player is not in the hand, a display indicating the player's option to call the cashier or the service personnel appears on the player's screen containing arrows pointing to the appropriate button which will summon one or the other.

Time greater than zero—if there is no time left for a player decision or it is not decision time, the only option for the player is to show or hide his hand. If there is time for a decision, then the following occurs: if the decision is discarding, pushing a button under a non-discarded card will result in that card being set for discarding. Pushing a button under a card already set for discard will result in that action being cancelled. In either case, the selected card will first be displayed momentarily on the console screen. If the decision is betting, pushing a button under the call, drop, or raise arrows will set the player to perform the desired action when the time runs out. Pushing a button causes the arrow above that button to disappear from the screen while the other arrows may appear in outline form.

All button pushing processing includes a check for the pushing of non-arrowed buttons. If this occurs, all of the arrows are displayed blinking which indicates to the player that the incorrect, or non-functioning button has been depressed. The player's hand is not normally displayed on the screen in order to maximise the security of his hand. One of the player buttons is used to show or hide those cards dealt to the player which would be dealt face down in a regular poker game. Pressing of this show/hide button will alternately cause these down cards to be displayed or not displayed on the player screen.

The foregoing processing actions are interrupted by the following situations in order of their priority:

Priority 1—the timer interrupt is activated by an internal clock every specified time interval (about 1/5th-second). The time count is decreased by one and is displayed on the player's console screen. If, after the decrease, the time is still greater than zero, the processing returns to its origin. When time reaches zero, the timer is disabled and, if the action is not related to betting, the processing returns to its original. If the time is a bet time, and either the drop button or no button has been pushed by the player, the player is placed in the dropped status and the processing returns to its origin. Otherwise, the amount of the bet is subtracted from the player's stake. If the player has no money left he is placed in "all-in" status.

Priority 2—panic button interrupt causes the player to be "all-in" for the pot and is placed in "panic" status.

Priority 3—(IEEE-488) attention interrupt causes the current player status and stake to be sent to the CPU.

Priority 4—(IEEE-488) listen interrupt allows the player console to process an event from the CPU as follows:

Deal—the player console quantifies both the high and low values of the entire hand and shows a card being dealt on the player's console screen. Up-cards in stud poker will be displayed, while all other cards and the hand's high and low values will be displayed only if the player's show/hide button is set for show.

Showing—after a draw, the seat number of all players still in the game will be displayed on each console in descending order of the number of cards drawn. For stud poker games, one card will be added to the card display of all of the players in the hand. The hands will then be cleared from the screen and quantified according to the high showing value and redisplayed in descending order.

Bet—if the player is "all-in" no options will be displayed. Otherwise, the amount needed to call or raise with respect to the player's remaining stake will be calculated and displayed above arrows pointing to the buttons for carrying out the appropriate action. The timer will also be started and displayed with the required count in which the decision must be made.

Draw—will display discard arrows and instructions to carry out the discard, and start the timer.

Winners—the winners' hands and amounts will be displayed and if a player is one of the winners, the winning amount will be added to his stake.

Escrow—escrow distributions will be displayed and, if the player is one of those to share in the escrow, his share will be added to his stake.

Other—will cause the data sent by the CPU to be displayed on the player's console.

After any of the above listen/interrupt processing is accomplished, the processing will return to its origins.

Game Procedure

When a player decides to participate in the game, he moves to the seat indicated as being available on overhead display 34 adjacent the entrance. Upon entering the game area, breaking the pulsed-beam 41 advances the entrance display to the next available seat. A display appearing on the player's individual console prior to the beginning of play explains the basic functions and rules of the game to the player (including the use of the show/hide button, the panic button and telephone) and allows him either to buy into the game or to play a hand with no risk, i.e., without being in the pot. If the player decides to buy into the game, he indicates his decision by pushing the designated button on his keyboard. The player's seat number will appear on one of the overhead displays 32 to direct the cashier to the player's seat.

Instead of immediately requesting to buy into the game, the player may elect to play a limited number of practice hands in which he receives cards and may drop, call, or raise without actually being in the pot. In this instance, his own console screen will reflect the action that he chose, but his hand will not be displayed on the other player's consoles as one of the hands in the pot. Obviously, the player cannot win or lose any money while playing a no-risk hand. A time or number limit may be placed on the practice hands after which the player may be required to either buy into the game or vacate the console. The CPU may be programmed to indicate this fact one one of the overhead displays and to direct a cashier to this player's seat.

The invention is initially directed toward playing 7-card high-low stud, but makes provision for a consolation round of 5-card draw for those players who have dropped out of the 7-card stud game prior to the appearance of their third up-card. This consolation round of draw poker may be eliminated if the number of players in the game is below a predetermined limit.

Once the player has elected to buy into the game and the cashier has duly entered the players buy-in amount in the CPU and completed the buy-in transaction, the following display may appear on the player's console screen:

| 7-Card Stud - The Best 5-Card High and Low Hands Split the Pot (Lowest Hand is 6-4-3-2-A) Each of your 7 Cards will come from a different 52-Card deck but you can't get duplicate cards | | | | |
|---|---|---|---|---|
| After Card | 3 | 4 | 5 | 6 | 7 |
| Bet | * | * | * | * | * |
| Raise | * | * | * | * | * |

Each "*" may be a fixed dollar amount or a percentage of the pot. The ante amount will appear in display element 128. This display remains on the screen for at least fifteen seconds for a player's first hand or when the limits are first changed. Thereafter this display will show for approximately four seconds.

Once the time for this display has expired, it disappears from the screen and a display similar to the example shown in FIG. 17 appears. FIG. 17 assumes there are fifty-two players in the game, the ante is $1, and the player in seat #33 just bought into the game for $100. The up cards of all players along with their seat number are shown on the upper portion 123 of the screen and are arranged in order of descending poker high value starting from the upper left corner of the screen and continuing to the lower right corner of display element 123. Cards or hands of equal value may be displayed in order of descending amount of player stake. Each of the cards is displayed against a green background as a white area with the card rank and suit in either the traditional red or black or in four different colors for maximum distinction. The player's own hand is also displayed, in somewhat larger scale, in area 138. Since the game is being described in terms of a 7-card stud high-low poker game, the first, second and seventh cards are displayed against a dark background to indicate that these are the "down" cards and are not displayed on any other player's screen. The third through sixth cards are displayed against a background of contrasting color to readily indicate to the player that these are the "up" cards and are displayed on all of the other player's screens. The lower portion of the screen also contains various information relating to the amount of money in the pot (area 126), the amount of money bet in area 128 ($2 in FIG. 17), and the total amount of money which the player has in area 134 ($100−$1 ante in FIG. 17). The seat number may also be displayed in area 136 on the screen to enable the player to identify his location should it become necessary to talk to the supervisor on the control platform. The screen also displays, in area 140, the high and low value of the hand according to a ranking system which will be described hereinafter.

Arrows and instructions located on the screen in display element 130 directly above the players push button keyboard indicate which buttons the player should push to call, raise, or drop out, and the amounts it will cost the player to call or raise. A timer in area 132 is also displayed which indicates the amount of time the player has to decide what is his action will be. The timer display appears in digital format and reads downwardly to zero in decrements of one (perhaps each fifth of a second). The precise amount of time given the player is not critical. It should be long enough to enable the player to make a rational decision, but short enough so as not to prolong the playing of the game. An audible sound may be connected to the timer to emit a descending musical scale during the last ten counts. If a player fails to indicate a decision before the timer reaches zero, the player is considered to have dropped out of the hand and play continues with the remaining players.

When the game play begins, each player receives two down cards displayed on the lower portion of his screen as noted above. The initial up card is displayed not only on the lower portion of the screen in the contrasting background, but each player's up card is also displayed on the upper portion 123 of all the screens. Following each individual betting action, a second, third, and fourth up card is dealt to each player with time allowed between each card to enable the players to call, raise, or drop.

In the instant invention, the CPU simulates the dealing of cards to players by randomly selecting first a number which represents the players in the hand and, second, another number which represents the cards in a poker deck. Random selection within a computer is commonly achieved by the generation of a random number. A random number is a number within a defined range wherein any number is equally likely to be generated next. The art for computer random number selection is known and there are random number generators available for most all computer models. A range of numbers from one through fifty-two covers all possible players and each number may be equated to a player seat number by various means, for example, sequentially clockwise from the player entrance. The fifty-two cards in a deck may be equated to numbers in the range one through fifty-two as shown in Table 2.

TABLE 2

| | Sample Numeric Values for Cards | | | |
| | Suit | | | |
| Rank | Heart | Diamond | Spade | Club |
| --- | --- | --- | --- | --- |
| A | 1 | 2 | 3 | 4 |
| 2 | 5 | 6 | 7 | 8 |
| 3 | 9 | 10 | 11 | 12 |
| 4 | 13 | 14 | 15 | 16 |
| 5 | 17 | 18 | 19 | 20 |
| 6 | 21 | 22 | 23 | 24 |
| 7 | 25 | 26 | 27 | 28 |
| 8 | 29 | 30 | 31 | 32 |
| 9 | 33 | 34 | 35 | 36 |
| 10 | 37 | 38 | 39 | 40 |
| J | 41 | 42 | 43 | 44 |
| Q | 45 | 46 | 47 | 48 |
| K | 49 | 50 | 51 | 52 |

In the invention, each round of cards is dealt from a new deck of cards, with the provision that a player cannot receive a card already in his hand. A maximum of fifty-two players can participate in a hand, but only one player can have any given card (for example, an ace of spades) for a first card and, at most, four players can have the same pair (for example, aces) in the first two cards dealt. Any number of players could participate in a hand, if each player were to receive cards from a separate deck. But, this latter method would allow every player to have the same pair (for example, aces) in the first two cards dealt. This could substantially raise the average value of the winning hands, be less interesting to the players and less similar to regular poker.

Dealing for each round starts with the construction of a software list of players who are in the hand. There would be as many such lists as there were different hands being played at the same time. A player will be randomly selected from the list of players in the hand. Randomly selecting each player affords a wider choice of cards to any player than selecting the players in any fixed sequence. The set of all cards which are both currently undealt in this round and not already in the selected player's hand is constructed and a card is randomly selected from this set. (The exceptional case in which this set contains no cards will be discussed below in detail). The selected card is removed from the list of cards currently undealt this round and added to the list of cards already in the player's hand. The selected player is removed from the constructed list of players. When the player list is depleted, the dealing round is completed. Otherwise, another player and another card are randomly selected as described above.

In dealing replacement cards for discarded cards (as encountered in draw poker), the first dealing round would provide a new card for all players who have discarded any cards. A second dealing round would provide a new card only for those players discarding at least two cards, etc. up to a round for the maximum number of discards.

On the first dealing round, a player is eligible to receive any of fifty-two cards. Since a player cannot receive any card already in his hand, on each succeeding round he is eligible for one less card, that is fifty-one cards on the second dealing round, fifty cards on the third, etc. down to one card if fifty-two rounds of cards are dealt. There is also one less card left in the deck for every player after each card is dealt in a round. So long as the number of cards left in the deck is greater than the number of cards already in the player's hand, there is always a card left in the deck that the player does not have. If the number of cards left in the deck is less than or equal to the number of cards already in the player's hand, it is possible that all of the cards left in the deck may already be in the player's hand. Thus, there may be no cards left in the deck which the 52nd selected player may receive on the second dealing round, the 52nd and 51st on the third dealing round, the 52nd, 51st, and 50th on the fourth round, and so forth, as the cards have by chance been dealt. In each dealing round, there are $52 \times 51 \times 50 \times \ldots \times 1$, or 52 factorial (52!) different card distributions possible for fifty-two players. As seen above, some of these distributions would give players duplicate cards and be invalid for the invention. It can be shown, however, that there are at least (52- dealing round number+1)! possible distributions of fifty-two cards to fifty-two players in any dealing round which produces cards for each player that are not already in the player's hand. That is, there are at least 51! valid card distributions for the invention with fifty-two players on the second dealing round, at least 50! on the third dealing round, and so forth.

Thus, if the situation arises in which there are no cards left in the deck which the selected player does not already have in his hand, the entire round of cards could be redealt immediately. If necessary, iterative redealing would eventually produce a valid card distribution.

To reduce redealing iterations if this situation arises, the CPU may be programmed to randomly select a card from those cards which are not already in the selected player's (for example, player A) hand. Such a selected card has obviously been dealt to another player (for example, player B) in this round. The set of cards which are both undealt this round and not already in player B's hand is constructed. If there are cards in this constructed set, one is randomly selected for player B. The card that player B had formerly received in this round is given to player A and is removed from the list of cards that player B already has. The newly selected card for player B will be removed from the list of cards currently left in the deck and will be added to the cards already in player B's hand. Player A is removed from the constructed list of players and processing continues in the cycle previously described for player and card selection.

If there are no cards in the set constructed for selection for player B, another card already dealt in this round but not already in player A's hand is selected. Such selection could continue until a card is located which was last dealt to a player (for example, player F) who is eligible for a card left in the deck for this round. In this event, one of the cards left in the deck will be randomly selected for player F, removed from the list of cards left in the deck, and added to the cards already in player F's hand. The card that player F had formerly received this round is given to player A and is removed from the list of cards that player F already has. If the last card for which player A is eligible is reached without a player (for example, player K) who was dealt that card in this round being eligible for any card remaining in the deck, player K's last card is given to player A, and the above processes for card selection would be imitated for player K.

The determination of the high and low values of each player's hand is referred to as quantification. The values of each player's best high and low hand are contained in two 6-part software registers. The first part of each register contains a code for the rank of the hand as follows: 0—no pair; 1—one pair; 2—two pair; 3—three of a kind; 4—straight; 5—flush; 6—full house; 7—four of a kind; and, 8—straight flush. The next five characters of each register contain the value of each of the five cards constituting the best hand in descending order. The values for cards 2-10 are the rank of the cards themselves. The jack, queen, king are represented by 11, 12, and 13, respectively. The ace has a value of 14 when being evaluated for a high hand and a value of 1 when being evaluated in a low hand. The suits of the cards need not be represented in the register, since all suits have the same value in poker.

The low value register may contain no 4, 5, or 8 code numbers under the common rule that straights and flushes are not counted against the player for determining the low hand, and such hands would all be given a 0 low code.

For example, a royal flush plus a 5 and a 3 would have a high code of 8, 14, 13, 12, 11 and 10, and a low code of 0, 11, 10, 5, 3, and 1. A full house of aces over 9's plus a jack and 4 would have a high code of 6, 14, 14, 14, 9, and 9, and a low code of 1, 1, 1, 11, 9, and 4.

The same evaluations are made for the up-cards (cards 3-6) for each of the players hands and are used to determine the high value and, consequently, the location of the hand on each of the player's screen. Since only four cards are evaluated, it is impossible to have a code of 4, 5, 6 or 8 for the maximum of four up cards.

After each display of an up card, a round of betting takes place in which each player can either call, raise, or drop out of the hand. As indicated previously, at the expiration of the time clock, the displays for those players who have dropped out of the hand are removed from each of the player's upper screen portion 123, and the pot amounts in 136 and each of the player amounts in 134 are adjusted according to their actions.

If no player calls or raises the bet which was generated by the computer, the hand is ended and a showdown, as will be described, takes place among all players who were in the pot prior to this bet. If there are calls but no raises, the game proceeds with dealing the next card. If there are any raises, the total amount of these raises, subject to the overall game betting limits, will appear in the bet amount area 128 of each player's screen. A raise symbol, such as an arrow, will appear over the current card of all raisers in display element 123. For this round of betting, the player may be restricted to either calling or dropping out of the hand. The hands of those players who drop will disappear from element 123.

The next up-card will then appear in each player's hand display area 138 and on the upper portion of the screen 123. The new cards in 123 will appear at the same time immediately to the right of each last previously shown card. All hands will briefly disappear from 123 on the screen, and reappear one at a time in the order of the new high value of their up-cards. Seat numbers and raise, all-in, and panic symbols will reappear along with the resequenced hands.

The players will again call, raise, or drop from the hand as described above. This process will continue until four up-cards are dealt and acted upon by the players.

The last card dealt in 7-card stud is, of course, a down card and appears only on the individual player's lower screen portion 138. After dealing this last card, each of the players hands are again evaluated for high/low values and these evaluations appear on his screen at 140 as noted above. If no one raises, the game goes to a showdown for the best hands. All of the player's hands are removed from the upper portion of the console monitors and the winning high and low hands are displayed in area 123 along with the winning dollar amount for each of the hands. However, if one or more players raise the bet following the last card, these players are indicated on the upper portion of the screen 123. Other players then have the opportunity to call or drop out as previously described. At the conclusion of this betting round, the winning hands are displayed on the screen along with their winning amounts, with the amounts being shown on the winner's console screen and credited to their stake. During the showdown display, instructions to order food or drinks or to summon the cashier may appear on the console monitor in display element 130.

If a player decides to cash-in at this time, he pushes the appropriate button on his keyboard to summon the cashier. The player's request will be noted and displayed on one of the overhead monitors 32 to direct the cashier to his console. When the cashier enters the cash-in code on his keyboard 74 the player monitor 90 will show the amounts to be paid to tha player and/or instruct the cashier to check the supervisor for amount confirmation. At the conclusion of the cash-in transaction, the player's console display returns to its initial format showing the rules of the game.

In table stakes poker, a player may put only as much into the pot as is remaining in his stake. This limitation creates what is known in the poker as "side pots" If there are ties for the winning hands, the pot must be divided in accordance with the amounts put in by the winners. If the game is high/low split, there must also be further division of the pot to accomodate the high and low value winners. In regular poker games, it sometimes requires several minutes to properly divide up a pot in which several winners have put in varying amounts. Since the invention accomodates many more players than usual and the possibility of ties is made somewhat greater by the use of several decks of cards, the contribution of different amounts to the pot by some of the players renders the pot division rather complex.

However, the devision of the pot can be achieved by sorting the six code registers for each of the players still in the pot at the showdown by descending code value, plus sorting them by ascending amounts of money that the player has put into the pot. Players sharing in the distribution of the pot will include all up to the first player in the above sort sequence who has put in the maximum amount that any other player has put in. It should be noted that each of the player's contributions to the pot is divided in half to provide a pot for the high winner and a pot for the low winner. The division of the pot will be discussed in terms of the high winner, but it is understood that the analysis is the same for determining the low winner, except that the six code registers are sorted in ascending code order.

In the simplest situation, if the first player in the sorted order has put in the maximum amount and the second player has a lesser value on the six code register, the first player receives the entire high half of the pot.

If, however, the first player has not put in the maximum amount and various players have tie hands, the situation becomes more complex. The situation will be explained in reference to the example in Table 3.

| Player | High hand | In Pot | High Half | A | left | B | left | C | left | D | left | E | left | F | left | G | left |
|---|---|---|---|---|---|---|---|---|---|---|---|---|---|---|---|---|---|
| | | | | Return to High "Winners" | | | | | | | | | | | | | |
| A | Flush | $80 | $40 | 10 | 30 | 10 | 20 | 10 | 10 | 10 | 0 | | | | | | |
| B | -tie | 92 | 46 | 10 | 36 | 12 | 24 | 12 | 12 | 12 | 0 | | | | | | |
| C | -tie | 92 | 46 | 10 | 36 | 12 | 24 | 12 | 12 | 12 | 0 | | | | | | |
| D | -tie | 100 | 50 | 10 | 40 | 12 | 28 | 12 | 16 | 16 | 0 | | | | | | |
| E | lower flush | 112 | 56 | 10 | 46 | 12 | 34 | 12 | 22 | 16 | 6 | 3 | 3 | 3 | 0 | | |
| F | -tie | 120 | 60 | 10 | 50 | 12 | 38 | 12 | 26 | 16 | 10 | 3 | 7 | 7 | 0 | | |
| G | straight | 140 | 70 | 10 | 60 | 12 | 48 | 12 | 36 | 16 | 20 | 3 | 17 | 7 | 10 | 10 | 0 |
| | others | | | | | | | | | | | | | | | | |
| H | | 8 | 4 | 1 | 3 | 1 | 2 | 1 | 1 | 1 | 0 | | | | | | |
| I | | 40 | 20 | 5 | 15 | 5 | 10 | 5 | 5 | 5 | 0 | | | | | | |
| J | | 80 | 40 | 10 | 30 | 10 | 20 | 10 | 10 | 10 | 0 | | | | | | |
| K | | 86 | 43 | 10 | 33 | 11 | 22 | 11 | 11 | 11 | 0 | | | | | | |
| L | | 104 | 52 | 10 | 42 | 12 | 30 | 12 | 18 | 16 | 2 | 1 | 1 | 1 | 0 | | |
| M | | 116 | 58 | 10 | 48 | 12 | 36 | 12 | 24 | 16 | 8 | 3 | 5 | 5 | 0 | | |
| N | | 124 | 62 | 10 | 52 | 12 | 40 | 12 | 28 | 16 | 12 | 3 | 9 | 7 | 2 | 2 | 0 |
| O | | 140 | 70 | 10 | 60 | 12 | 48 | 12 | 36 | 16 | 20 | 3 | 17 | 7 | 10 | 10 | 0 |
| P | | 140 | 70 | 10 | 60 | 12 | 48 | 12 | 36 | 16 | 20 | 3 | 17 | 7 | 10 | 10 | 0 |
| Total winnings | | | | $146 | | $169 | | $169 | | $205 | | $22 | | $44 | | $32 | |
| | | | | A | | B | | C | | D | | E | | F | | G | |

The amount that the first player in either winners queue is entitled to is subtracted from the amount that each player, including those who have dropped from the hand, has put into each half of the pot. If there is another player in the winners queue who is entitled to part of the pot, the above process continues on the remaining amounts in each player's pot contribution remaining after the withdrawal for the previous winner. The amount that each winning player is entitled to is equal to any player's remaining amount in the high (or low) pot after the shares for all previous winners have been subtracted, divided by the number of ties with this player's hand which have not as yet been subtracted.

In Table 3, a complex situation is shown in which seven players are entitled to a share of the high portion of the pot. In this Table, players A–D are tied for the high hand with a flush, while players E and F are tied with each other with a lower value flush. Player G has a straight and has no ties. Player A, who has contributed $80.00 to the pot ($40.00 for the high half of the pot) will receive a portion of each player's contribution to the high pot up to a maximum amount of $10.000 from each player. The $10.00 is arrived at by subtracting the previous winners shares (in this instance zero) from his contribution to the high pot ($40.00) and dividing this amount by four (the number of players tied for the winning hand). Thus, as can be seen from Table 3, player A will receive $10.00 from each of players A-G and J-P (who have contributed $40.00 or more to the high pot), in addition to $1.00 from player H and $5.00 from player 1. Thus, A's total winnings for this hand will be $146.00. Player B will also receive a portion of each of the players contribution to the high pot up to a maximum of $12.00 from each player. Again, this figure is determined by taking player B's contribution to the high pot ($46.00), subtracting the share for all previous winnings ($10.00 paid to player A) and dividing this amount by three (the number of ties for the winning hand remaining). Thus, player B contributed $46.00 to the high pot and by subtracting the $10.00 for player A and dividing by 3, the maximum amount of $12.00 is achieved. Player B's winnings of $169.00 include $10.00 from player A, $12.00 each from players B-G and L-P, $11.00 from player K, $10.00 from player J, $5.00 from player 1 and $1.00 from player H.

Player C will also receive a maximum of $12.00 from each player's contribution to the high pot. This is determined by adding the amounts previously paid to players A and B ($10.00 and $12.00) and subtracting this amount from player C's contribution to the high pot ($46.00) and dividing the result by 2, the number of ties not as yet subtracted. Thus, as indicated on Table 2, player C's total winnings will also be $169.00 since C's hand is tied with player B and both have contributed the same amount to the pot.

A similar analysis can be made to determine player D's winnings of $205.00. After players A-D have received their winnings, there is still money left in the high half of the pot since other players put more money into the pot than any of the winners, as illustrated in Table 3. Continuing the above described pot splitting procedures will yield a return of $22.00 to player E, $44.00 to player F, and $32.00 to player G.

A similar analysis is undertaken to determine the winner or winners of the low half of the pot. The house cut will be deducted from the amount returned to each winner. Calculations of all dollar amounts including current player stake may be computed to several decimal places, but the stake amount shown on the player's console may be displayed and paid to a whole dollar amount obtained either by rounding or truncation.

In the instant invention, the pot may be divided into more than the two portions found in regular poker and all such portions need not be equal. Various splitting schemes may be used such as dividing the pot between the best high and best low hands, and hands containing any specified cards or by awarding the best high and low hands 43% of the pot and the next best high and low hands 7%. Computations for the returns to the winners would be similar to those described above except that fractions other than one-half of the amount each player puts into the pot would be used.

If a player drops out of the 7-card stud game prior to the appearance of the third up-card, he may be automatically entered in a consolation round of 5-card draw. When the player drops out of the 7-card stud game at this point, instructions for the 5-card draw game as well as the betting limits may be displayed on the player's console in area 123 as shown below:

| 5-Card Draw High and Low Hands Split the Pot (Lowest Hand is 6-4-3-2-A) Each of your 5 original and (Maximum 5) Drawn Cards will come from a different 52-Card deck but you can't get duplicate cards | |
|---|---|
| Before Draw | After Draw |
| Bet * | * |
| Raise * | * |

Where each "*" may be a fixed dollar amount or a percentage of the pot. The ante amount will appear in display element 128. Instruction to order food or drinks or call the cashier will appear on the lower portion on the screen. Five cards then appear on the lower portion 138 of the player's screen. The five card display is similar to the player's display format in the 7-card stud hand except, as shown in FIG. 18, only five cards are shown. The player's cards will be displayed or hidden depending upon the player's use of the show/hide button. Each of the players hands are quantified, by the method noted above, and the high and low values are displayed at 140 on their screens if the show/hide button is in show status.

The computer generated opening bet is shown in display element 128 on each player's screen. The game legend in 124 is the same as for the 7-card stud game except that the name of the game is shown as 5-card draw. Player instructions are displayed in 130 and the timer in area 132. The player may call, raise, or drop as previously described. If there are any raises, the seat numbers of all players who have raised and any who are allin or have "panicked" are shown in the display element 123 with the same symbols above the seat numbers as were used in the 7-card stud game, and the player has another opportunity to call or drop as described for the 7-card stud game.

Those players who have called all bets remain in the hand and must now decide which (if any) cards they wish to discard. The player indicates a discard by pressing the button on button panel 108 which is pointed to by the arrow tip under each card. All discard decisions must be made within the specified time period (before the timer shown in area 132 reaches zero). As soon as a discard button is pressed, the card to be discarded is partially obscured by the arrow tip, whose color may be changed. If there is sufficeint time on the timer, the player may cancel a discard by again pressing the button below the discarded card. FIG. 18 shows a sample display for elements 124 through 132 after one discard button has been pressed (under the six of hearts card) by player #33.

When the timer reaches zero, each card to be discarded is replaced by a new card which is not a duplicate of any card in the player's hand (including cards discarded). The first card drawn by every player comes from a new deck of fifty-two cards. The second drawn card from a second new deck, etc. Otherwise, the dealing technique for the entire hand is the same as described above for 7-card stud. After the draw each player's hand is quantified by the previously described method for high and low values which appear in display element 140. The upper portion 123 of each player's console, displays the number of cards drawn by each player along with any raise, all-in or panic symbols.

Another round of betting takes place after the draw in which players have another opportunity to call, raise or drop. Symbols for actions taken after the draw will appear over box 161 to the right of any symbols for pre-draw actions over the player seat number, and the last raise symbol may blink. FIG. 19 shows a sample display of element 123 after post-draw raises have been indicated. For sake of example, player #55 raised before and after the draw as indicated by arrows 162 appearing above his seat number; player #69 raised before the draw only indicated by arrow 162; and player #33 raised only after the draw. Also, player #41 was all-in before the draw as indicated by arrow 164; and player #68 "panicked" after the draw. The player seat numbers are displayed in ascending order according to the number of discards. The number of discards may be shown in box 166.

Following the second round of betting, the hands are quantified as previously described in relation to the 7-card stud game and the draw game proceeds to showdown. If a player drops out during the draw game, his cards are removed from his display screen and, obviously, the player receives no further cards. Cashier information, food/drink orders or other promotional messages may be displayed on his screen at this time. The dropped players hands are also eliminated from the upper screen section 123 of the remaining players. During the showdown, the winning hands are displayed on the upper portion 123 of each player's screen along with the winning amount for each hand. The winning amount for each hand is determined by the method previously described in relation to the 7-card stud game. The winner's stakes are appropriately increased. The winning hands for the 7-card stud game may also be displayed for the players information.

Table 4 shows an approximate display time for each of the events for both the main 7-card stud game and the consolation draw game. The total time from the initial display of the rules and limits for the 7-card stud game through the maximum number of bets and raises is envisioned to be approximately two minutes. The time available for the players to make their decisions is kept to a minimum in order to increase the concentration on the part of the players and to keep the game moving along at a pace such that the players do not lose inerest. Quite obviously, the Table 4 time for each event can be altered depending upon the skill level of the participants, number of players, amounts bet, or various other factors.

TABLE 4

| Approximate display time in seconds for each event | | |
|---|---|---|
| Total time | Main 7-stud game | Consolation draw game |
| :04 | rules/limits :04 | rules/limits :07 |
| :18 | bet-1 :14 | rules/limits :03 |
| :25 | raise-1 :07 | pre-draw bet :14 |
| :39 | bet-2 :14 | pre-draw raise :07 |
| :46 | raise-2 :07 | discard round :14 |
| :60 | bet-3 :14 | post-draw bet :13 |
| 1:07 | raise-3 :07 | post-draw raise :09 |
| 1:21 | bet-4 :14 | showdown :11 |
| 1:28 | raise-4 :07 | |
| 1:41 | bet-5 :13 | |
| 1:48 | raise-5 :07 | |
| 2:00 | showdown :12 | |

Table 4 also illustrates a simplified sample event queue for the simultaneous playing of two games. The time entities in the table may represent more than a single event as events were defined in the previous Program Logic section. The rules/limits time for the 7-card stud game consists of start hand and deal (3 cards) events. The bet-1 time consists of show value, bet, and call events. Each of the bet-2 through bet-5 times consist of deal (1 card), show value, bet, and call events. Each of the raise-1 through raise-5 times consist of bet and call events, and the showdown time for 7-card stud consists of a winner event.

The first rules/limits time for 5-card draw consists of the starthand event. The second such time continues the start-hand event and also consists of a deal (5 cards) event. The pre and post draw bet times consist of bet and call events as do the pre and post raise times. The discard time consists of draw, deal (as many as discarded), and show value events, and the showdown time for 5-card draw consists of a winner event.

The instant invention has thus far been described in terms of a primary 7-card stud game and a consolation 5-card draw game. However, the types of poker which may be simulated by the invention are not limited to these, and additional games may be played for player variety and casino experimentation. 5-Card and 6-card stud are obvious extentions.

5-Card draw could be played with two rounds of drawing rather than being limited to the one round of regular poker by adding a second draw round to the event queue. Replacement cards would be dealt from additional decks as needed. Such a double draw game could also have three rounds of betting: opening, between draws, and final. The same player displays would be used as in the above-described (single) 5-card draw game. The display element 123 after the second draw, would indicate the number of cards drawn on the second draw in the boxes 166 similar to single draw. The number of cards drawn on the first draw could be displayed in box 161 immediately to the right of each player seat number and would be the secondary sorting factor.

Poker games in which one or more cards from a stud hand are exchanged could also be played. Such games are sometimes called "twist" poker and it is usual for an exchanged hole card to be dealt face down, and an exchanged up-card to be dealt face up. "Twist" games could be simulated by addition of draw rounds (with a maximum discard of one) to the event queue of stud games. The player displays would follow those as in stud, except at the time the player could "twist" or discard. Then, the player display in elements 128, 130, and 138 would be the same as in draw.

Poker games in which several cards are shown face up for common usage by all players in addition to their individual hole cards could also be simulated by the instant invention. The dealing algorhithm for common-card games would be modified to select all the common cards from the first deck, then deal the remaining cards as the player's first hole card. The common cards would also be removed from each successive deck prior to dealing to the players. Thus the total number of possible players for this game would be fifty-two minus the number of common cards, i.e., forty-eight players if four common cards; forty-seven players if five common cards, etc.

For such games, the common cards would first be shown face down in display element 123 of each player's upper screen. The player's hole cards would appear in area 138. The value of the player's hand including common cards would appear in 140. There could be a round of betting as previously described. Then open or more common cards would be turned face up with an accompanying round of betting. Additional betting rounds would accompany the turning up of any common cards or the dealing of an additional hole card to the players. FIG. 20 shows a sample display for a common-card poker game which is a variant of a game called "Hold'em" In this "Hold'em" variation, four common cards are dealt face down, and each player receives three hole cards. There are betting rounds before the first common card is turned face up, and then additional betting rounds after each of the common cards are turned face up one at a time. FIG. 20 is a sample situation for calling the raises after the showing of the third common card (fourth betting round). The seat numbers of all players also appear in 123. Raisers on the current betting round would have the usual raiser symbol such as arrow 162 above and somewhat to the right of the seat number. All previous-round raises would be summarized into one symbol 168 located directly above the seat number which contained a single horizontal line for each previous raise. The lines of the previous raise symbol would be of the same color as the raise symbol and would designate in which rounds the raises occured by increasing vertical position. The usual symbols for all-in and "panic" are used in this betting round and any previous round. In FIG. 20, for example, player #33 has raised each round, player #57 has raised on only the current round, player #71 has raised on all previous rounds only, and player #25 has raised on round 2 only. Players #42, #44, and #46 went all-in on previous betting rounds, and players #60 and #61 have just called all bets. The seat numbers in area 123 may be sequenced first by last round raise then by decreasing number of previous raises with those all-in or "panicked" last. After completion of the betting round for the next common card turned face up, the game proceeds to a show down for players remaining in the hand as previously described in relation to the 7-card stud game.

In other common-card variants, the common cards may be dealt in the shape of a cross with two cards on the horizontal axis, two cards on the vertical axis, and a card in the center which is considered to be on both horizontal and vertical axes. The player may not use cards from different axes to construct one hand (high or low) but may use different axis to construct separate high and low hands. In the instant invention two separate sets of quantifications would be required with the center card, after it was turned up, evaluated in both quantification sets.

The foregoing descriptions of the various embodiments are provided for illustration purposes only and should not be construed as in any way limiting this invention, the scope of which is solely defined by the appended claims.

I claim:

1. An electronic system for playing a card game of poker involving interactive wagering among a plurality of human players comprising:
    (a) a central processing unit having:
        (i) CPU input means enabling all players to substantially simultaneously make one of a plurality of responses to a set of wagers of any plurality of players, wherein each response of each player: is made to the same set of wagers; and is made at any time within the same time period such that with respect to interactive wagering all responses are considered as taking place at the same time;
        (ii) means to electronically assign one or more cards to the plurality of players;
        (iii) means to initiate and transmit all events relating to the playing of the poker card game;
        (iv) means to tabulate, store and transmit data received from the plurality of players in response to the poker card game events;
        (v) means to tabulate, store and transmit interactive wagering data received from the plurality of players to each of the other players;
        (vi) means to evaluate each player's cards and determine an order of finish of the players; and,
        (vii) means to divide the total amount wagered in accordance with the order of finish of the players; and,
    (b) a plurality of individual player consoles, one for each of the plurality of players, electrically connected to the central processing unit, each console having:
        (i) means to electronically receive and display the cards assigned to the individual player;
        (ii) first input means to allow each player to respond to the game events initiated by the central processing unit, including means to allow an individual player to drop out of the game while play continues for the remaining players;
        (iii) second input means to allow each player to transmit wagering data to the central processing unit; and,
        (iv) means to receive and display wagering data relating to the other players.

2. The electronic poker card game of claim 1 wherein the central processing unit electronically transmits all events relating to the playing of stud and draw poker.

3. The electronic poker card game system of claim 1 wherein the central processing unit electronically transmits all events relating to the playing of 7-card stud poker.

4. The electronic poker card game system of claim 3 wherein the central processing unit further comprises:
    (a) means to generate a display of each player's own cards such that they appear only on that player's monitor;
    (b) means to generate a display of all the player's up-cards such that they appear on all players' monitors;
    (c) means to generate a display of the total amount bet such that it appears on all players' monitors; and,
    (d) means to generate a display of the amount remaining in the player's stake such that it appears only on that player's monitor.

5. The electronic poker card game system of claim 4 further comprising:
    (a) means associated with the central processing unit to evaluate and rank each player's up-cards according to a pre-assigned point value for the hand; and
    (b) means associated with the player console to display each player's up-cards on each console monitor screen in a predetermined order according to their rank.

6. The electronic card game system of claim 5 further comprising:
    (a) means associated with the central processing unit to evaluate and rank each player's own cards according to a pre-assigned point value for each hand into a highest value hand and a lowest value hand; and
    (b) means associated with the player console to display the highest value hand the lowest value hand on only the player's own console monitor screen.

7. The electronc poker card game system of claim 1 wherein the central processing unit electronically transmits all events relating to the playing of 5-card draw poker.

8. The electronic poker card game system of claim 7 wherein the central processing unit further comprises:
(a) means to generate a display of the player's cards such that they are displayed only on each player's monitor;
(b) means to generate a display of the number of cards discarded by all of the players such that it appears on all players' monitors;
(c) means to generate a display of the total amount bet such that it appears on all player's monitors; and,
(d) means to generate a display of the amount remaining in each player's stake such that it is displayed only on each player's monitor.

9. The electronic poker card game system of claim 8 further comprising:
(a) means associated with the central processing unit to evaluate and rank each player's own cards according to a predetermined point value for each hand into a highest value hand and a lowest value hand; and,
(b) means associated with the player console to display the highest value hand and the lowest value hand on only the player's own console monitor screen.

10. The electronic poker card game system of claim 1 wherein each player console comprises:
(a) a cabinet structure defining a player station and a rear station;
(b) a monitor located within said cabinet structure, said monitor having a display screen viewable from said player station;
(c) a microprocessor located in said cabinet structure, and electrically connected to said monitor and said central processing unit;
(d) a first keyboard connected to the first and second input means, and being accessible from the player station to enable the player to input game and wagering data into the central processing unit; and
(e) a second keyboard located adjacent to and being accessible from the rear station to enable the input of cashier transactions and other data to the central processing unit.

11. The electronic poker card game system of claim 1 wherein the player console further comprises timer means set to a predetermined amount of time during which the player must actuate the first and second input means to transmit game and wagering data to the central processing unit.

12. The electronic poker card game system of claim 1 wherein the second input means allows each player to call or raise a wager of other players.

13. The electronic poker card game system of claim 12 wherein the central processing unit has means to initiate and transmit all events for a concurrent poker card game to players who have dropped out of the initial card game.

14. The electronic poker card game system of claim 1 wherein the central processing unit includes means to electrically transmits all events relating to the playing of stud poker in which players have the option to electronically exchange one or more of their cards.

15. The electronic poker card game system of claim 1 wherein the central processing unit includes means to electronically transmit all events relating to the playing of stud poker in which one or more sets of face-up cards are used in common by all players.

16. An electronic system for playing a card game of poker involving interactive wagering among a plurality of human players comprising:
(a) a central processing unit having:
(i) CPU input means enabling all players to substantially simultaneously make one of a plurality of responses to a set of wagers of any plurality of players, wherein each response of each player: is made to the same set of wagers; and is made at any time within the same time period such that with respect to interactive wagering all responses are considered as taking place at the same time;
(ii) means to electronically assign one or more cards to the plurality of players;
(iii) means to initiate and tansmit all events relating to the playing of the poker card game;
(iv) means to tabulate, store and transmit data received from the plurality of players in response to the poker card game events;
(v) means to tabulate, store and transmit interactive wagering data received from the plurality of players to each of the other players;
(vi) means to rank each player's hand according to a predetermined point value for each hand, into a highest value hand and a lowest value hand;
(vii) means to evaluate each player's cards and determine an order of finish of the players; and,
(viii) means to divide the total amount wagered in accordance with the order of finish of the players; and
(b) a plurality of individual player consoles, one for each of the plurality of players, electrically connected to the central processing unit, each console having:
(i) means to electronically receive and display the cards assigned to the individual player;
(ii) means to display the different value hands of each player only on that player's own console;
(iii) first input means to allow each player to respond to the game events initiated by the central processing unit, including means to allow an individual player to drop out of the game while play continues for the remaining players;
(iv) second input means to allow each player to transmit wagering data to the central processing unit; and
(v) means to receive and display wagering data relating to the other players.

17. The electronic poker card game system of claim 16 wherein the means to display the different value hands comprises means to display each player's highest value hand and lowest value hand only on the player's own console.

* * * * *